United States Patent [19]
Hasbun et al.

[11] Patent Number: 6,088,759
[45] Date of Patent: *Jul. 11, 2000

[54] METHOD OF PERFORMING RELIABLE UPDATES IN A SYMMETRICALLY BLOCKED NONVOLATILE MEMORY HAVING A BIFURCATED STORAGE ARCHITECTURE

[75] Inventors: Robert N. Hasbun, Shingle Springs; David A. Edwards, Orangevale, both of Calif.

[73] Assignee: Intel Corporation, Santa Clara, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/885,117

[22] Filed: Jun. 30, 1997

Related U.S. Application Data

[63] Continuation-in-part of application No. 08/834,930, Apr. 6, 1997.

[51] Int. Cl.[7] ..................................................... G06F 17/30
[52] U.S. Cl. ........................... 711/103; 711/170; 711/173; 707/206
[58] Field of Search .................................... 711/103, 170, 711/173; 395/652, 182.13, 182.04; 365/185.11; 707/206

[56] References Cited

U.S. PATENT DOCUMENTS

| | | |
|---|---|---|
| 4,758,944 | 7/1988 | Bartley et al. ............................ 711/171 |
| 4,849,878 | 7/1989 | Roy .............................................. 711/4 |
| 5,297,148 | 3/1994 | Harari et al. ............................. 714/710 |
| 5,333,292 | 7/1994 | Takemoto, et al. ....................... 711/103 |
| 5,361,343 | 11/1994 | Kosonocky et al. ................. 365/185.11 |
| 5,404,485 | 4/1995 | Ban ........................................... 711/202 |
| 5,410,707 | 4/1995 | Bell .......................................... 395/652 |
| 5,437,020 | 7/1995 | Wells et al. .................................. 714/6 |
| 5,479,639 | 12/1995 | Ewertz .................................... 711/103 |

(List continued on next page.)

OTHER PUBLICATIONS

"A TrueFFS and Flite Technical Overview of M–Systems' Flash File Systems", M–Systems Technology Brief, Oct. 1996 (pp. 1–10).

Products Guide, M–Systems (reprinted Apr. 1997), (3 pgs.).

News & Events: Products, Partners and Corporate Press Release Index, M–Systems, (reprinted Apr. 11, 1997), (1 page).

(List continued on next page.)

*Primary Examiner*—Do Hyun Yoo
*Assistant Examiner*—Than Nguyen
*Attorney, Agent, or Firm*—Blakely, Sokoloff, Taylor & Zafman LLP

[57] ABSTRACT

Methods of allocating, writing, reading, de-allocating, re-allocating, and reclaiming space within a nonvolatile memory having a bifurcated storage architecture are described. In one embodiment, a method of reliably re-allocating a first object stored within a block erasable nonvolatile memory includes the step of allocating space for a second object. A write of the second object is initiated and the writing of the second object is tracked. In another embodiment, a method of re-allocating a first object stored within a block erasable nonvolatile memory includes the step of invalidating the first object, if the first object has an unreliable type of recovery level. Space is allocated for the second object. A write of the second object is initiated and the writing of the second object is tracked. In another embodiment, a method of reliably re-allocating a first object stored within the block erasable nonvolatile memory includes the step of allocating space for the second object. A write of the second object is initiated and the writing of the second object is tracked. The first object is invalidated after completion of writing the second object, if the first object has a reliable type of recovery. In one embodiment, the first object resides within a first portion of nonvolatile memory and the instructions for performing the described methods reside in a second portion of nonvolatile memory. The first and second portions can reside within a same nonvolatile memory such as a symmetrically blocked flash electrically erasable programmable read only memory.

24 Claims, 29 Drawing Sheets

U.S. PATENT DOCUMENTS

| | | | |
|---|---|---|---|
| 5,519,831 | 5/1996 | Holzhammer | 714/22 |
| 5,519,843 | 5/1996 | Moran et al. | 711/103 |
| 5,522,076 | 5/1996 | Dewa | 395/652 |
| 5,530,673 | 6/1996 | Tobita et al. | 365/185.09 |
| 5,533,190 | 7/1996 | Binford | 395/182.04 |
| 5,535,357 | 7/1996 | Moran et al. | 711/103 |
| 5,535,369 | 7/1996 | Wells et al. | 711/171 |
| 5,544,356 | 8/1996 | Robinson et al. | 707/205 |
| 5,563,828 | 10/1996 | Hasbun et al. | 365/185.33 |
| 5,579,522 | 11/1996 | Christeson | 395/652 |
| 5,581,723 | 12/1996 | Hasbun | 711/103 |
| 5,592,669 | 1/1997 | Robinson | 707/206 |
| 5,596,738 | 1/1997 | Pope | 711/103 |
| 5,602,987 | 2/1997 | Harari et al. | 714/8 |
| 5,603,056 | 2/1997 | Totani | 710/8 |
| 5,671,388 | 9/1997 | Hasbun | 711/103 |
| 5,680,570 | 10/1997 | Rantala et al. | 711/113 |
| 5,701,492 | 12/1997 | Wadsworth et al. | 395/712 |
| 5,715,423 | 2/1998 | Levy | 711/103 |
| 5,717,886 | 2/1998 | Miyauchi | 711/103 |
| 5,737,742 | 4/1998 | Achiwa et al. | 711/103 |
| 5,829,013 | 10/1998 | Hasbun | 711/103 |
| 5,937,434 | 8/1999 | Hasbun | 711/170 |

OTHER PUBLICATIONS

"M–Systems Introduces Industry's Fastest SCSI Flash Disk", News and Events Press Releases, M–Systems, Mar. 14, 1996 (2 pgs.).

"FlashDisk alternatives, ATA Versus FTL", M–Systems, May 1996 (8 pgs.).

"Offering up to 72 Mbytes in a single–chip 32–pin DIP, Flash DiskOnChip 2000 showcases striking improvements in capacity, performance and price", News and Events Press Releases, M–Systems, Embedded Systems conference, Mar. 17, 1997 (3 pgs.).

"Flash PC Card Performance and Capacity Boosted with the Series 2000 NAND–based Architecture", News and Events Press Releases, M–Systems, Jan. 27, 1997 (2 pgs.).

"FTL, Flash Translation Layer", M–Systems, (reprinted Apr. 11, 1997), (2 pgs.).

"Intel and M–Systems Sign FTL Marketing Agreement", News and Events Press Releases, M–Systems, Dec. 11, 1995 (2 pgs.).

"AMD Flash Card Products Supported by TruFFS Software", News and Events Press Releases, M–Systems, Apr. 24, 1991 (2 pgs.).

"M–Systems Announces a NOR Flash Disk Solution Suite", New and Events Press Releases, M–Systems, Aug. 19, 1995 (3 pgs.).

Maurice J. Bach, "The Design of the Unix Operating Systems", Prentice–Hall, Inc., 1986, pp. 285–305.

METHOD OF PERFORMING RELIABLE UPDATES IN A SYMMETRICALLY BLOCKED NONVOLATILE MEMORY HAVING A BIFURCATED STORAGE ARCHITECTURE

This application is a continuation-in-part of application Ser. No. 08/834,930 filed on Apr. 6, 1997.

FIELD OF THE INVENTION

This invention relates to the field of computer systems. In particular, this invention is drawn to management of nonvolatile memory.

BACKGROUND OF THE INVENTION

Initialization of a computer system is performed upon power-up of the computer system or hardware or software reset operations. The initialization process is referred to as "booting" the computer system.

In one boot scheme the processor is designed to read a pre-determined memory location when the processor is reset or powered up. The pre-determined memory location stores a boot vector which directs the processor to a memory address of the beginning of the bootstrap routines.

The boot vector typically defaults to an address in readonly memory (ROM). The ROM stores the computer system boot code such as the bootstrap loader and other initialization routines. The device storing the bootstrap loader and other minimal initialization procedures is referred to as the boot device.

Traditionally, ROM or EPROMs have served as nonvolatile memory for storage of computer system boot code. The boot code may include software such as Basic Input Output System ("BIOS") routines which are specific to the computer system being booted. Thus system specific information is also stored in the ROM or EPROM.

One disadvantage of this approach, however, is the inability to reprogram the ROM or EPROM to accommodate changes in the computer system. The only way to make changes to the BIOS, for example, is to replace the ROM or EPROM. This may be difficult if the ROM or EPROM is soldered to a circuit board. In addition, the computer may have to be at least partially disassembled in order to gain access to the ROM or EPROM.

A programmable nonvolatile memory such as flash electrically erasable programmable read only memory (flash EEPROM) provides a medium that allows the BIOS to be adapted to changing hardware and software conditions. BIOS updates can be performed using an update program in order to modify the BIOS to accommodate, for example, new peripheral devices, additional memory, add-in cards or even to fix errors in the current version of the BIOS.

Flash memory can be reprogrammed only after being erased. Erasure of flash memory must be performed at a block level, thus in order to change a few bytes within a block, the entire block must first be erased. The bootstrap loader, BIOS, and system parameters can be located in separate blocks to facilitate independent modification.

The flash memory used to store boot code and BIOS is typically asymmetrically blocked due to the size differences between the bootstrap loader, BIOS, and system parameter data. Thus the bootstrap loader is stored in a block of one size and the BIOS is stored in one or more blocks of a different size. In addition, blocks storing system specific parameter data might be yet a third size.

One disadvantage of this approach is that asymmetrically blocked architectures are more difficult to expand or extend as the stored code or data changes in size. The block sizes are fixed when the nonvolatile memory is fabricated, thus the block sizes cannot subsequently be changed in order to allocate excess memory from one block to another block.

The asymmetrically blocked architecture typically results in wasted memory because there is no provision for management of the excess memory within individual blocks. BIOS update programs typically replace the contents of the block containing the old BIOS with the new BIOS. Thus any data sharing the same block as the BIOS will be lost when the BIOS is updated. This prevents other applications from being able to use excess memory within a block. Thus another disadvantage of the asymmetrically blocked architecture is the inability to use excess memory within a block.

When updating BIOS, the blocks that the BIOS is stored in must first be erased. If a power failure occurs after starting the erasure of the blocks and before the new version of the BIOS has been completely written, then the BIOS within the nonvolatile memory may be left in an unusable state. Furthermore, the computer system cannot recover by using the old BIOS because the old BIOS was deleted when the block was erased. Thus the upgrade process is inherently unreliable because of the inability to return to a former valid state if an error occurs while updating to the new state. Thus another disadvantage of the single and asymmetrical blocked architectures is the sensitivity of the update process to events such as a power failure.

SUMMARY OF THE INVENTION

In view of limitations of known systems and methods, methods of managing nonvolatile memory are provided. In one embodiment, a method of reliably re-allocating a first object stored within a block erasable nonvolatile memory includes the step of allocating space for a second object. A write of the second object is initiated. The method includes the step of tracking the write status of the second object.

In another embodiment, a method of re-allocating a first object stored within a block erasable nonvolatile memory includes the step of invalidating the first object, if the first object has an unreliable type of recovery level. Space is allocated for the second object. A write of the second object is initiated. The method includes the step of tracking the write status of the second object.

In another embodiment, a method of reliably re-allocating a first object stored within the block erasable nonvolatile memory includes the step of allocating space for the second object. A write of the second object is initiated. The method includes the step of tracking the write status of the second object. The first object is invalidated, if the first object has a reliable type of recovery.

In one embodiment, the first object is stored within a first portion of nonvolatile memory. Instructions for performing the described methods are stored within a second portion of nonvolatile memory.

Other features and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements and in which.

DETAILED DESCRIPTION

I. Computer System Architecture

Figure 1:
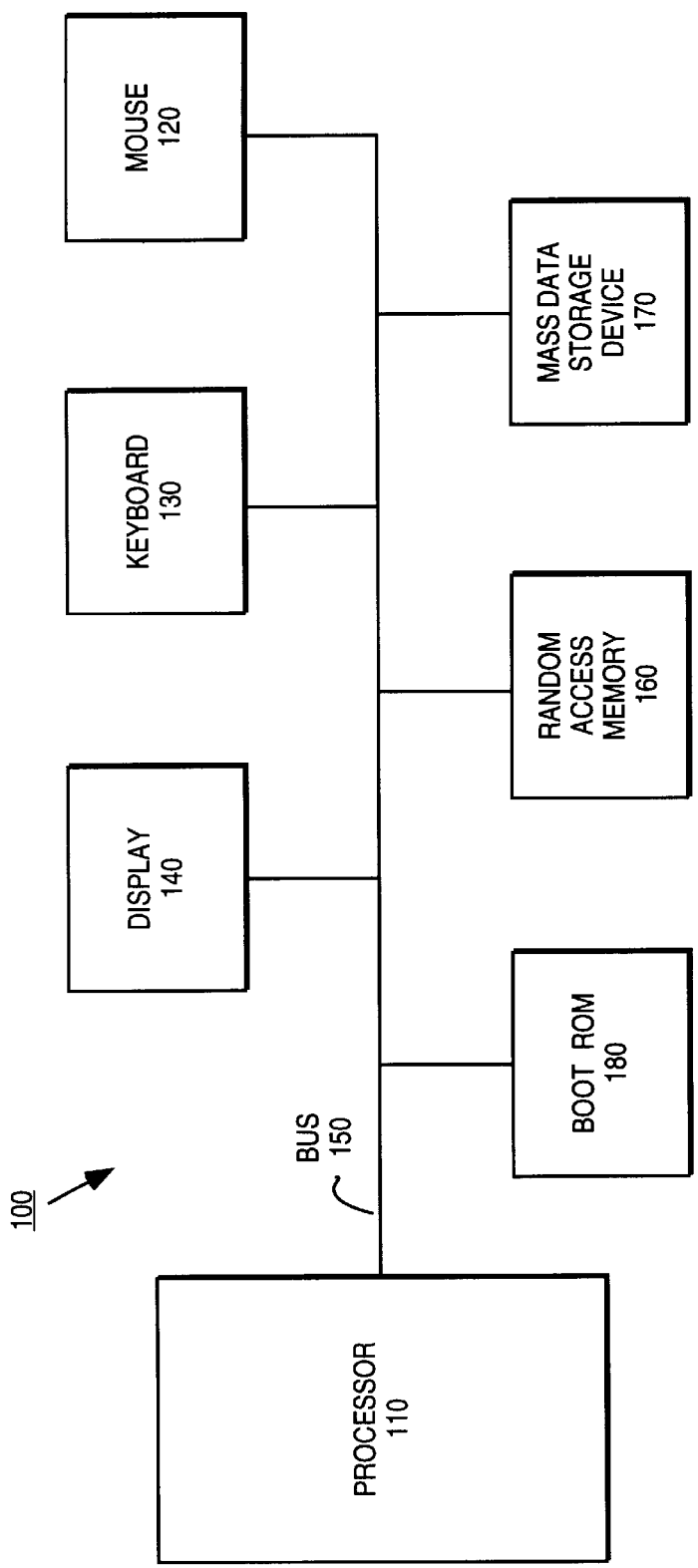
FIG. 1 illustrates a computer system block diagram.

FIG. 1 illustrates a basic microprocessor-based computer system architecture. The computer system 100 includes processor 110. Input devices such as mouse 120 and keyboard 130 permit the user to input data to computer system 100. Information generated by the processor is provided to an output device such as display 140. Computer system 100 generally includes random access memory (RAM) 160 which is used by the processor. Nonvolatile mass data storage device 170 is used to retain programs and data even when the computer system is powered down. In one embodiment nonvolatile mass storage device 170 is an electromechanical hard drive. In another embodiment nonvolatile mass storage device 170 is a solid state disk drive. Mouse 120, keyboard 130, RAM 160, boot ROM 180, and nonvolatile mass storage device 170 are typically communicatively coupled to processor 110 through one or more address and data busses such as bus 150.

Initialization of the computer system is performed upon power-up of the computer system or hardware or software reset operations. In one boot scheme the processor is designed to read a pre-determined memory location when the processor is reset or powered up. The pre-determined memory location stores a pointer or an address which directs the processor to a memory address of the beginning of the bootstrap routines. The pointer or address is referred to as a boot vector.

The boot vector generally defaults to an address in read-only memory (ROM). For software resets, however, the boot vector may point to a RAM location. The ROM stores the bootstrap loader and typically stores other initialization routines such as power on system test (POST). The device storing the bootstrap loader and other minimal initialization procedures is referred to as the boot device. Boot ROM 180 is the boot device in computer system 100.

The ROM may include routines for communicating with input/output devices in the computer system. In some computer systems these routines are collectively referred to as the Basic Input Output System (BIOS). The BIOS provides a common interface so that software executing on the processor can communicate with input/output devices such as the keyboard, mouse, nonvolatile mass memory storage device, and other peripheral devices.

Often parameter information which identifies specific features of the input/output devices is also stored in a nonvolatile memory. In one embodiment, the parameter information is stored in battery-backed complementary metal oxide semiconductor (CMOS) based memory. For example, parameter information might describe the number of disk drives, disk drive type, number of heads, tracks, amount of system RAM, etc.

ROM based storage techniques for BIOS tend to be inflexible with respect to modification. The BIOS provided with the system may have errors or be limited to handling certain kinds or types of peripheral devices. In order to modify the computer system, the ROM containing the BIOS must be replaced. This may require partially disassembling the computer system to gain access to the ROM. The ROM may be difficult to replace if it is solder mounted.

ROMs, programmable read only memory (PROM), and electrically programmable read only memories (EPROMs) represent various types of nonvolatile semiconductor memories. Another type of nonvolatile semiconductor memory is flash electrically erasable programmable read only memory. Unlike the battery-backed CMOS memory used for parameter information storage, flash memories retain their contents without the need for continuous power.

The use of flash memory for storing the BIOS permits greater flexibility in handling system modification or BIOS updates. The BIOS can be updated by running a program thus eliminating the need to replace ROMs.

Flash memory cells cannot be rewritten with new data without first erasing them, with the exception that any flash memory cell storing a "1" can always be programmed to a "0". Generally, flash memory cells are not individually erasable. Flash memories are typically subdivided into one or more individually erasable blocks. An entire block must be erased in order to erase any cell within the block. Erasure of a block of flash memory sets all the cells within the block to a pre-determined value. By convention, an erased flash cell is considered to be storing a value of "1".

Figure 2:
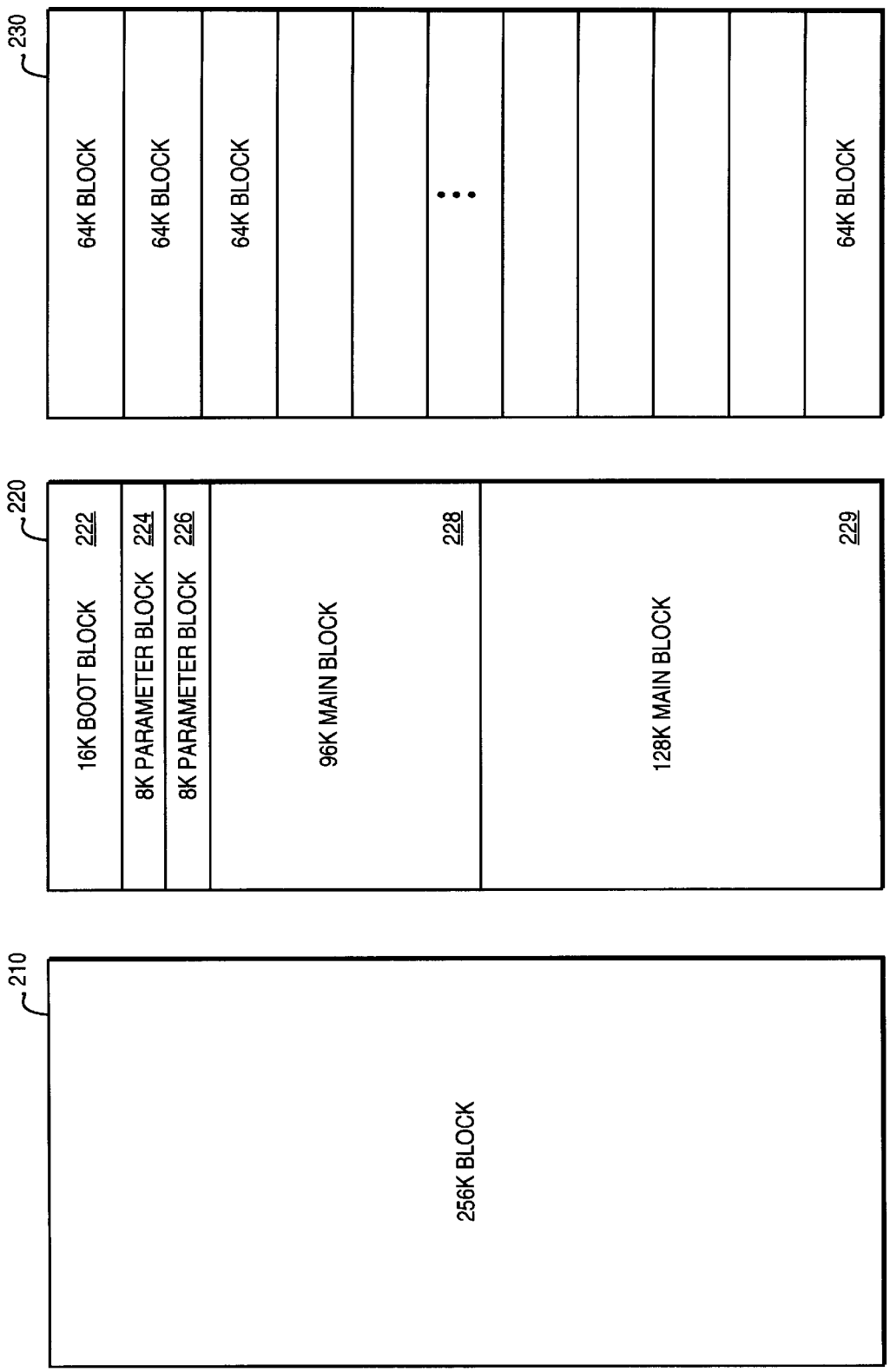
FIG. 2 illustrates bulk, asymmetrically, and symmetrically blocked nonvolatile memories.

FIG. 2 illustrates a single block architecture 210 and an asymmetrically blocked architecture 220 for storing the bootstrap routines, parameter data, and BIOS. The single or "bulk" block architecture 210 must be fully erased before being reprogrammed. Thus the bootstrap loader, the BIOS, and computer system specific parameter information are erased every time the BIOS or parameter information is modified.

The bootstrap loader, BIOS, and parameter data can be placed in separate blocks in order to permit independent modification. An asymmetrical blocking architecture is designed to accommodate storage of the bootstrap loader, BIOS, and parameter data in separate blocks in accordance with the relative sizes of the bootstrap loader, BIOS, and parameter data.

Asymmetrical blocked architecture 220 provides separate blocks for bootstrap routines, parameter data, and BIOS. The bootstrap routines are stored in boot block 222. Boot block 222 may also be referred to as startup block 222. Parameter data is stored in blocks 224 and 226. BIOS is stored in blocks 228 and 229. Thus the bootstrap routines, parameter data, and BIOS are treated as objects which can be independently modified by placing them in physically distinct blocks. The boot block may be a hardware-locked block to prevent its modification.

The update process for single and asymmetrically blocked architectures is typically not a reliable process. If a power failure occurs between initiation of the erase procedures and before a block has been completely reprogrammed, the computer system may not be able to properly reboot because the contents of the block may be missing or invalid.

With respect to the single block architecture, a power loss may be particularly catastrophic. Because the flash memory must first be erased before being reprogrammed, the bootstrap loader and other initialization routines may not be available upon power up.

The asymmetrically blocked architecture permits independently updating the BIOS or parameter data without erasing the startup block. The device is blocked so that objects such as bootstrap routines, parameter data, and BIOS can be placed in separately erasable blocks. The need to place all the objects within a nonvolatile memory of predetermined size requires limiting wasted memory within the boot device. These constraints result in a nonvolatile memory having different-sized blocks. The size and number of blocks may need to change as computer systems become more sophisticated. The block sizes of the asymmetrically blocked flash, however, are determined when the nonvolatile memory is fabricated. Thus the asymmetrically blocked architecture tends to be inflexible with respect to expansion of the startup block, parameter information, and BIOS.

For example, the parameter block is fixed in size and thus parameter data cannot exceed the block size determined at the time of fabrication. In addition, because the architecture is designed to store specific types of information in each block, any excess memory within a block is wasted. Excess space within the BIOS block cannot be used because the data stored there will be lost during a BIOS update. Thus the storage "granularity" of an asymmetrically blocked flash architecture varies and is limited to the size of the individual blocks.

An alternative to the bulk and asymmetrically blocked architectures is to use a flash memory manager (FMM) in conjunction with a symmetrically blocked architecture 230. The FMM "virtualizes" block boundaries so that each stored object is treated as if it resides in its own block. For applications external to the FMM, this permits handling the stored objects without regard to the physical blocks they reside in or span. Instead of placing functionally distinct routines and data in separate physical blocks to ensure independent modification, the FMM provides a means of managing objects independently of physical block boundaries.

II. FMM Architecture

In order to virtualize blocks, the FMM treats items to be stored as objects. An object is any item, value, or data that can be stored in an identifiable area of memory. BIOS, parameter data, and executable code are examples of objects. The term "object" also refers to the identifiable area of nonvolatile memory used for storing the item. The primary functions performed by the FMM include object allocation, writing, reading, de-allocation, re-allocation, reclamation, and power loss recovery.

Figure 3:
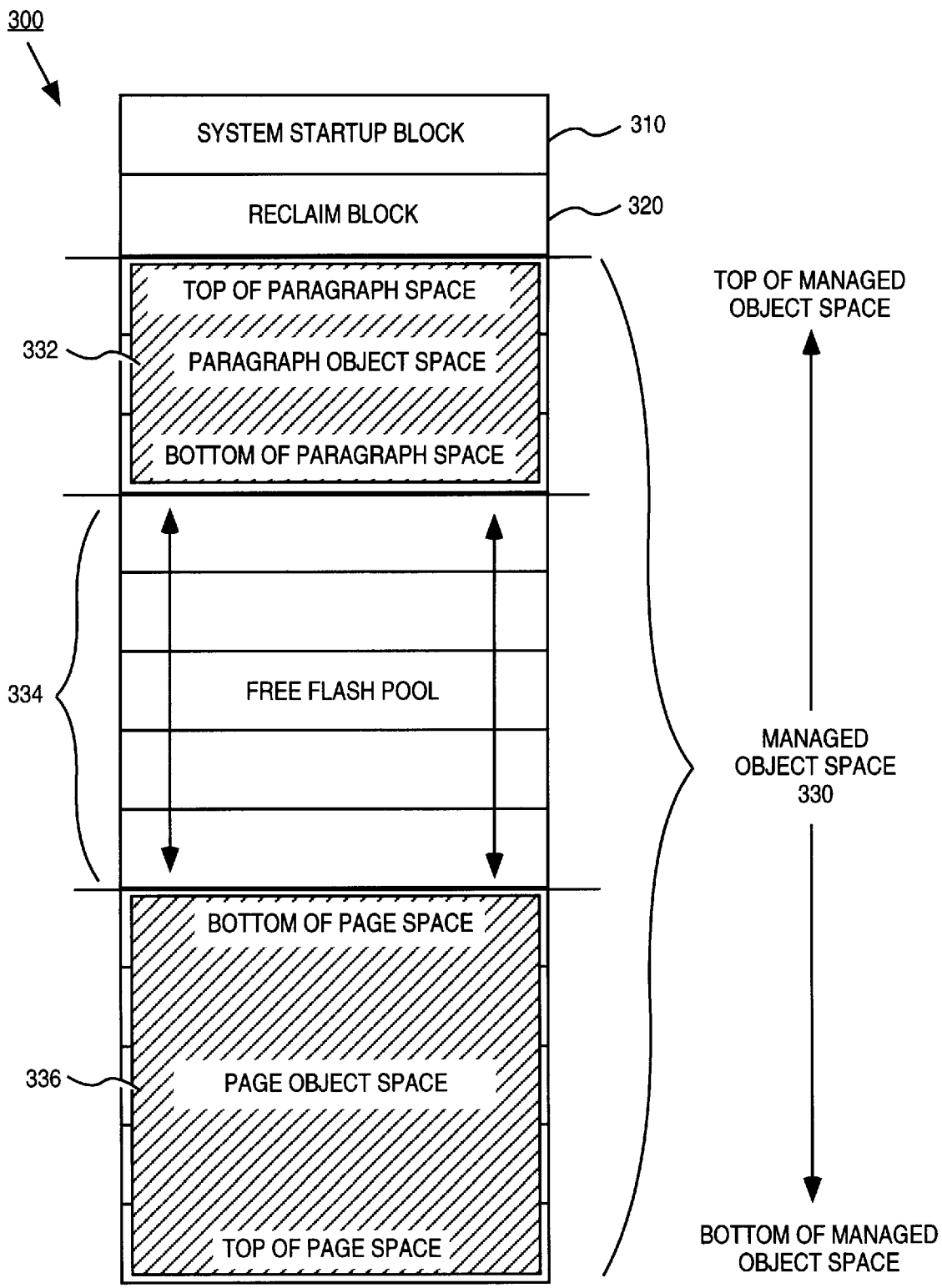
FIG. 3 illustrates division of a nonvolatile memory into the system startup block, reclaim block, and managed object space.

FIG. 3 illustrates one embodiment of the FMM architecture based on symmetrically blocked flash memory 300. The FMM architecture divides the nonvolatile memory into three dedicated areas. These areas include the system startup block 310 and reclaim block 320. The remaining area is referred to as the managed object space 330.

In one embodiment, system startup block 310 contains the necessary minimal amount of code or data required to initialize the computer system. Thus system startup block 310 might store the system initialization code such as a bootstrap loader. In one embodiment, the FMM code is also stored in system startup block 310. Any other code or data required for booting an operating system or defining system parameters may be stored as an object within the managed object space 330. For example, BIOS may be treated as an object and stored within managed object space 330.

The size of system startup block 310 is determined by the flash block size and data bus organization. In one embodiment, the system startup block is a single, one time programmable block that is not accessible by the FMM for object storage. In an alternative embodiment, the system startup routines are stored in a plurality of contiguous system startup blocks.

Reclaim block 320 is used during the process of reclaiming memory allocated to objects that are no longer valid. In the embodiment illustrated, reclaim block 320 is located immediately after the startup block. In an alternative embodiment, reclaim block 320 is located in another dedicated location within the flash memory. Although only one block is illustrated for reclaim, other embodiments might use a plurality of reclaim blocks or other form of temporary storage.

FMM stores objects within managed object space 330. FMM provides for two classes of objects: paragraph objects and page objects. Each class has its own allocation granularity, thus the FMM provides multiple allocation granularities for storing objects. This helps to eliminate wasteful memory usage by permitting the size of the "virtual" blocks to be closely fitted to the size of the item being stored.

The managed object space is divided into regions to accommodate the distinct object classes. In particular, page space 336 stores page objects and paragraph space 332 stores paragraph objects. Thus managed object space 330 is a bifurcated managed object space. Object allocation, writing, reading, de-allocation, re-allocation, and reclamation functions vary depending upon whether the functions are performed for paragraph objects or page objects.

Referring to FIG. 3, space for paragraph objects is contiguously allocated from the top of managed object space 330 and grow towards the bottom of managed object space 330. Paragraph objects are always aligned on a paragraph boundary. A paragraph object is allocated an integer number of paragraphs when stored. In one embodiment, a paragraph is 16 bytes, thus any paragraph object will use an integer number of 16 byte paragraphs.

Page objects are contiguously allocated from the bottom of the managed object space 330 and grow towards the top of managed object space 330. Page objects are always aligned on a page boundary. A page object is allocated an integer number of pages when stored. In one embodiment, pages are 4K in size, thus any page object will use an integer number of 4K pages.

In order to perform object allocation, writing, reading, de-allocation, re-allocation, and reclamation within the managed object space, FMM uses a number of data structures. These data structures serve as tracking or auditing structures for managing the storage of the objects. In one embodiment, these data structures are stored within the managed object space. In an alternative embodiment, the data structures are not stored within the same managed object space as the objects they track.

One of the data structures used by FMM is a header. Every object within managed object space is identified by a header. In one embodiment, the headers are stored in paragraph space 332, thus the headers themselves are also paragraph objects.

Headers may be further classified as paragraph headers and page headers. Paragraph headers identify another associated paragraph object. This other object may also be referred to as paragraph data. Thus paragraph headers and their associated paragraph data are stored within paragraph space.

Page headers identify a page object. The page object may alternatively be referred to as page data. Page data is stored in page space. The page headers, however, are stored in paragraph space.

Figure 4:
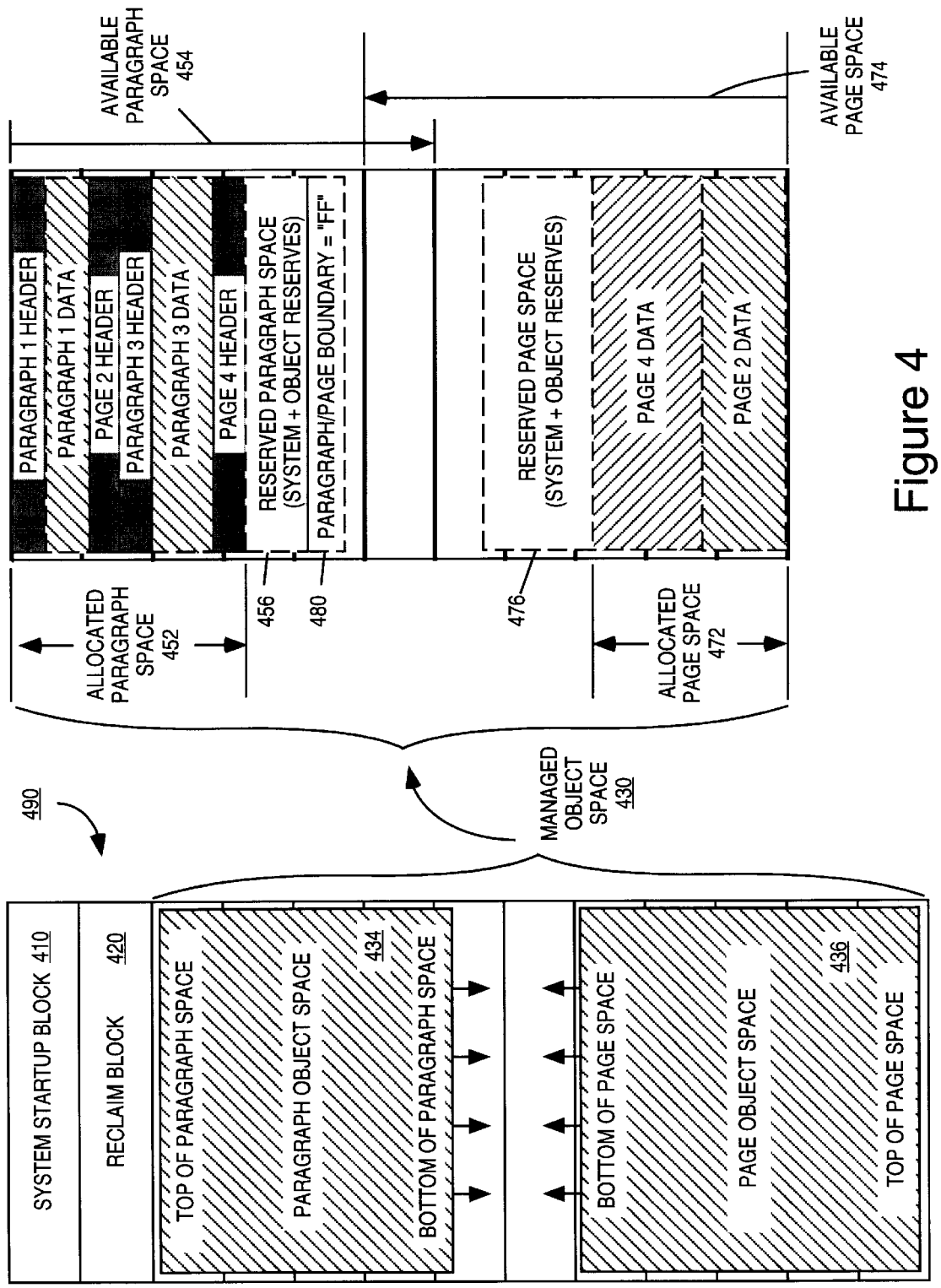
FIG. 4 illustrates the arrangement of managed object space.

FIG. 4 illustrates page and paragraph objects stored in managed object space 430 within nonvolatile memory 490. The top of managed object space 430 starts immediately after reclaim block 420. The top of allocated paragraph space 434 coincides with the top of managed object space 430. The top of allocated page space 436, however, coincides with the bottom of managed object space 430. The bottoms or ends of allocated page space and allocated paragraph space grow towards each other as page or paragraph space is allocated.

Figure 5:
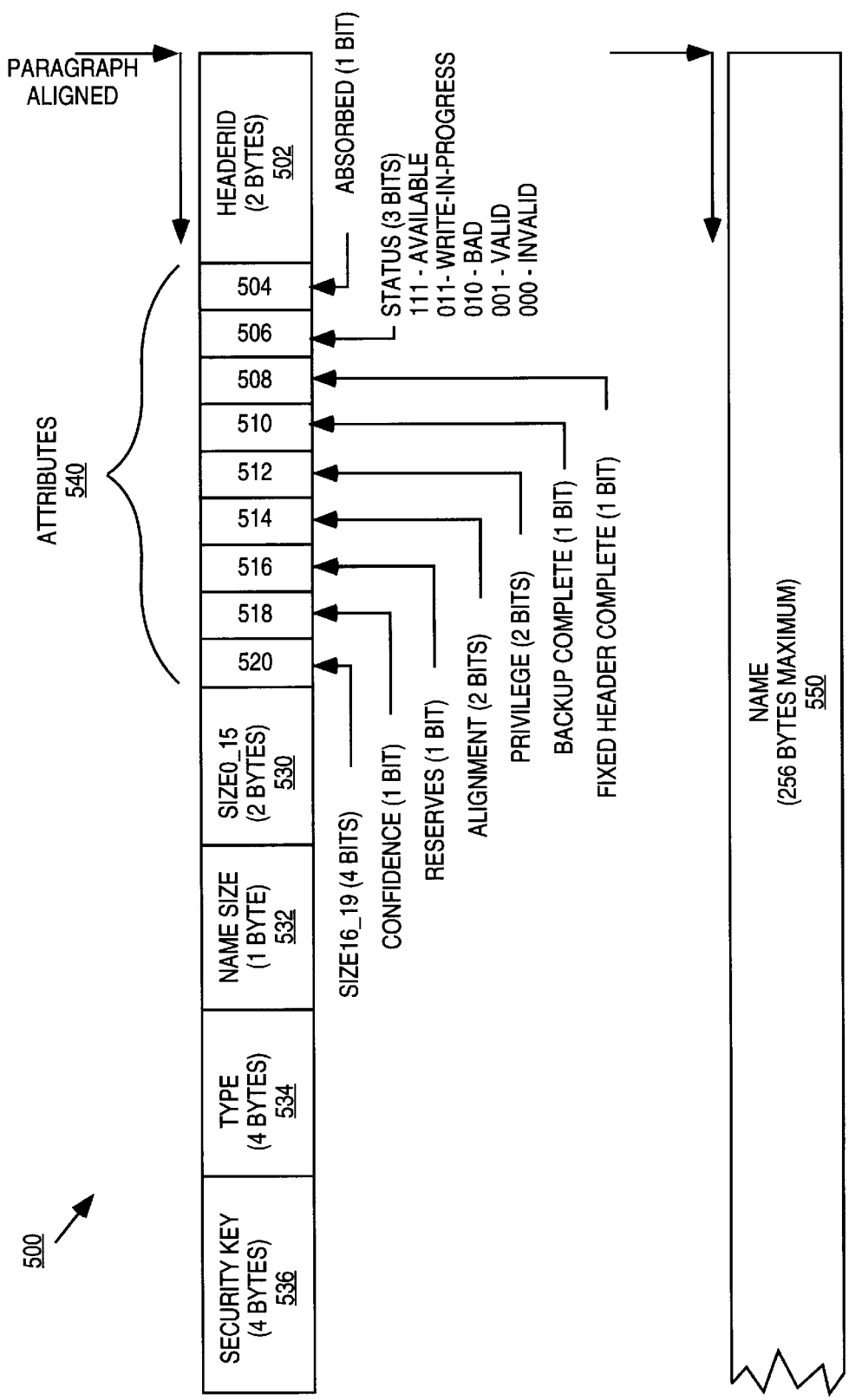
FIG. 5 illustrates a data layout for a header.

Headers for identifying paragraph objects and page objects are stored within paragraph object space along with other paragraph objects. A header provides information about the properties of its associated object space such as name, type, and size of the object. FIG. 5 illustrates one embodiment of a header data structure 500. A definition of the header fields is included in the Appendix.

Referring to FIG. 4, the location of objects within their respective spaces is determined by proximity. Objects are contiguously located in their respective object spaces such that no gaps exist between objects.

Paragraph data is located immediately after the paragraph header that identifies that paragraph object. Given that the length of the header and the amount of memory allocated for the paragraph data are known, the location of the next header or other paragraph object can be determined.

The position of a page header relative to other page headers determines the location of page data in page space. For example, the location of page 4 within page space is determined by summing the page space used by all preceding page objects. This is accomplished by summing the size (i.e., indicated by Size0_15 530 and Size16_19 520) indicated by page headers preceding the page 4 header. In this example, the only preceding page header is the page 2 header. Given that page objects are allocated contiguously from the bottom of managed object space towards the top of managed object space, the size of the preceding page objects (page 2) indicates an offset from the top of page object space to the beginning of the desired page object (page 4).

III. FMM Processes

Primary processes of the FMM include object allocation, writing, reading, de-allocation, re-allocation, and reclamation.

A. Allocation

FIGS. 6–9 illustrate the allocation process. The allocation process is used when 1) initially allocating space for an object, and 2) when re-allocating space for an object. The process varies depending upon whether the context is initial allocation or re-allocation.

Figure 6:
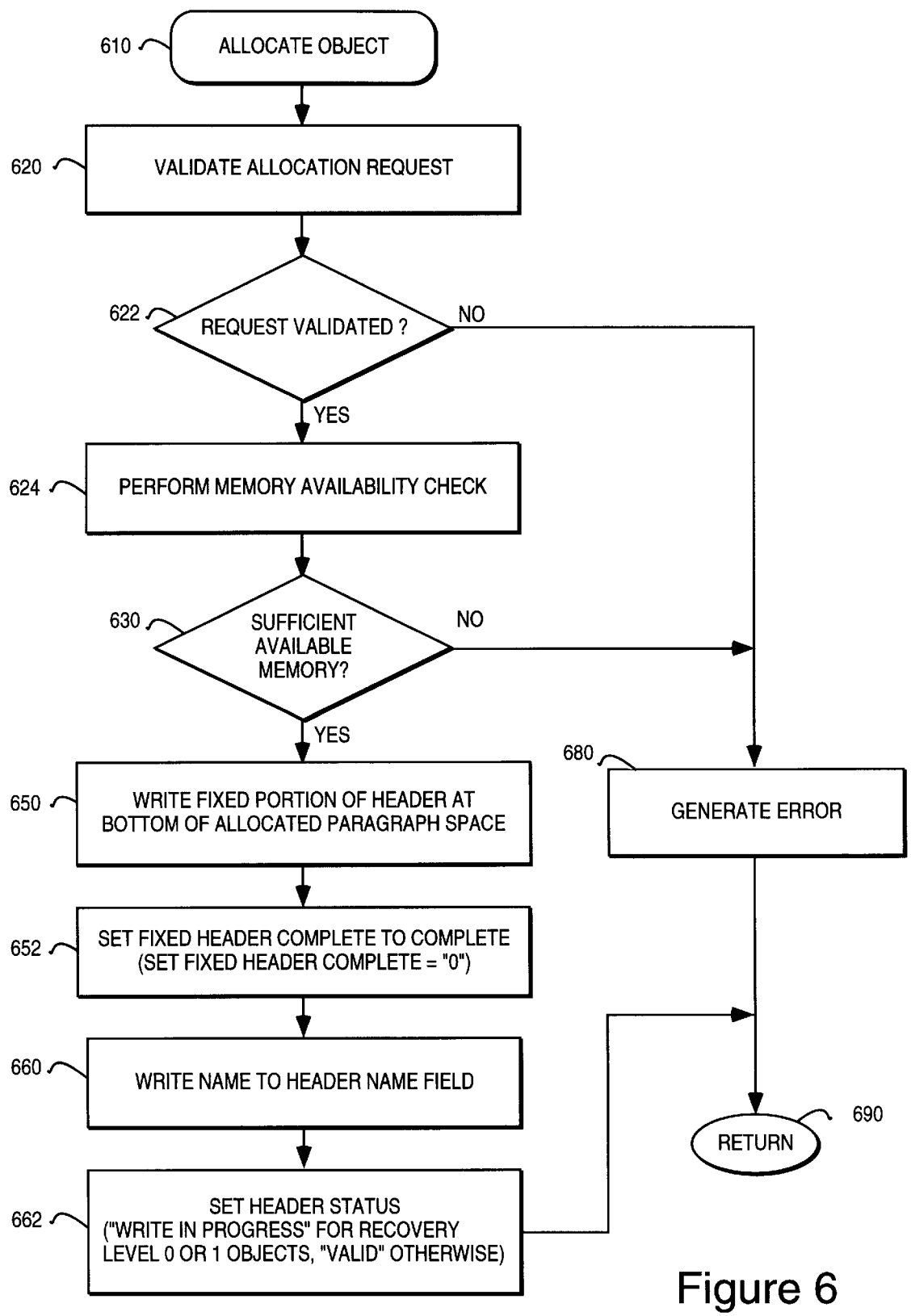
FIG. 6 illustrates a method for allocating space for an object.

Referring to FIG. 6, the allocate object process begins in step 610. In order to allocate space for an object, certain properties of the object must be provided. Referring to FIG. 5, in one embodiment, the Name 550, Name Size 532, Type 534, Size (i.e., Size0_15 530 and Size16_19 520), and Alignment 514 properties must be provided. Once space has been allocated, the space may be written to or read from. In addition the object can be de-allocated or re-allocated. In one embodiment, Name 550 and Type 534 are used in conjunction with Status 506 to uniquely identify objects when allocated.

Figure 7:
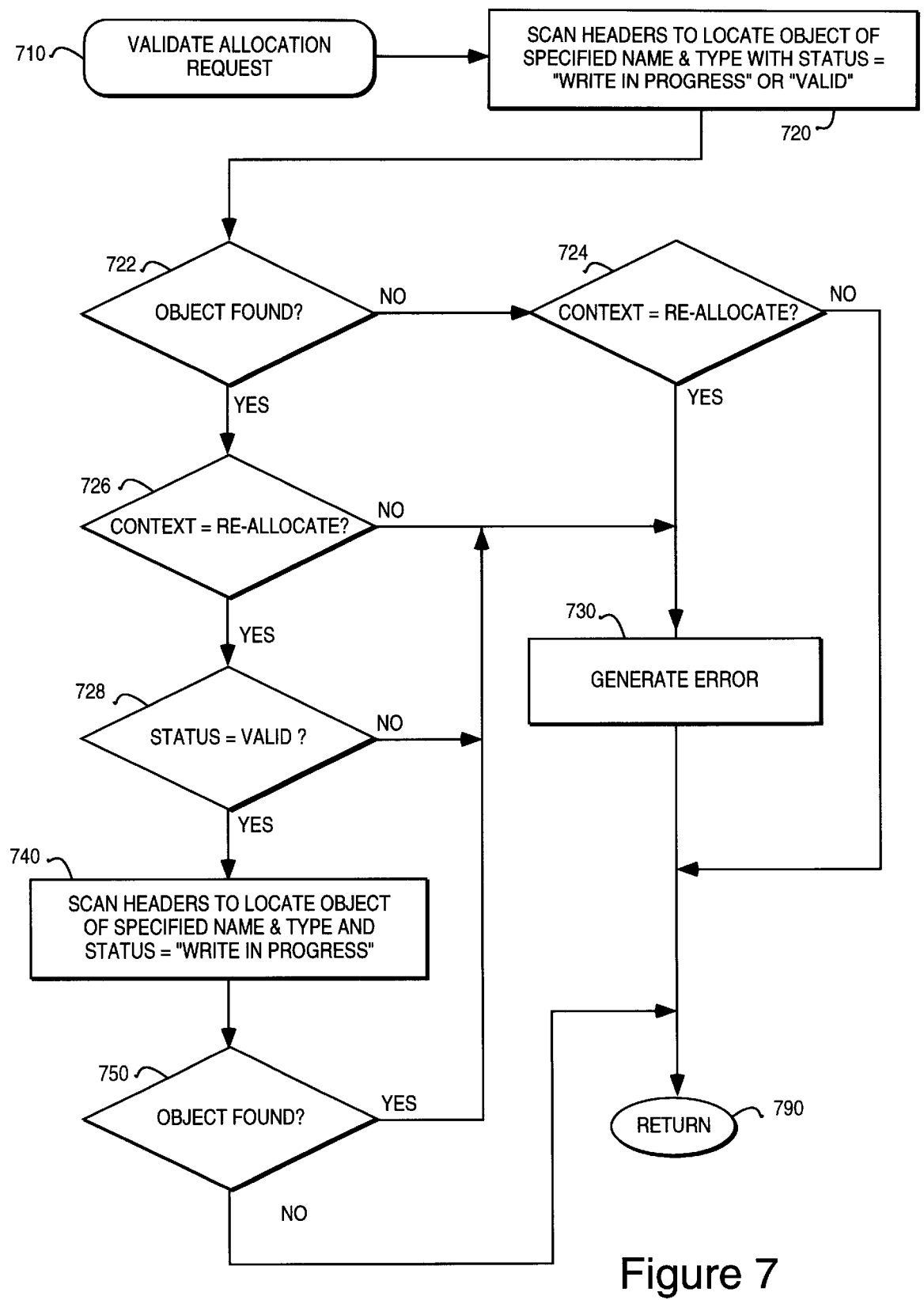
FIG. 7 illustrates a method for validating an allocation request.

In step 620, the allocation request is validated. FIG. 7 illustrates validation of the allocation request in greater detail beginning with step 710. If the context of the current request is re-allocation, then a valid object having the specified Name and Type should already exist. If, however, the context of the current request is initial allocation, the request cannot be granted if a valid object having the specified Name and Type already exists.

Step 720 scans paragraph space to locate the first object of the specified Name and Type which has a status of Valid or Write In Progress. Step 722 determines whether such an object was found. If such an object is not found, then step 724 determines whether the context is re-allocation. If the context is re-allocation, an error is generated in step 730 to indicate that a re-allocation attempt was made on a non-existent object. Lack of another valid object having the same Name and Type is required for initial allocation, thus if the context is not re-allocation the allocation may proceed in step 790.

If step 722 determines that the object sought in step 720 is found, processing continues with step 726. Step 726 determines if the current request context is re-allocation. If the current context is not re-allocate, an error is generated in step 730 due either to a non-unique Name and Type key (when Status=Valid) or a prior incomplete re-allocation operation (when Status=Write In Progress). If the current context is re-allocate, then steps 728 thru 750 are performed to ensure that an unfinished re-allocation is not currently being performed.

During a re-allocation operation the allocate object process may be used to allocate space for a second object having the same Name and Type as a pre-existing first object. If this is the case then the pre-existing first object should have a status of Valid.

Thus step 728 determines if the first found object of the specified Name and Type has a status of Valid. If the status is not Valid, then allocation cannot proceed. An error is generated in step 730.

Alternatively, if the status is Valid, processing continues with steps 740 and 750 to ensure that a re-allocation operation is not already in progress. The existence of a second object having a same Name and Type as the pre-existing first object, but with a status of Write In Progress instead of Valid indicates that re-allocation has already been initiated for the specified object.

In step 740 the headers are scanned to locate an object of the specified Name and Type having a status of Write In Progress. If an object meeting the conditions of step 740 is found in step 750, then re-allocation has previously been initiated for the object and space should not be allocated for a concurrent re-allocation. Thus processing proceeds to step 730 to generate an error to indicate that re-allocation is already in process for the object.

If no object meeting the conditions of 740 is found, then a re-allocation may be performed for the identified object. Thus processing continues in step 790.

Returning back to FIG. 6, step 622 determines whether an error occurred during validation of the request. If an error occurred during validation, then processing continues with step 680 to generate an error. The allocation process then returns in step 690 without having allocated the requested space.

If the request is validated in step 622, step 624 performs a memory availability check to determine if memory can be allocated as requested. Steps 630 determines whether there is sufficient space available for allocation. If there is insufficient space, then an error is generated in step 680 and processing is completed in step 690 without performing the allocation. If there is sufficient space, however, processing proceeds to step 650.

Steps 650, 652, 660, and 662 effectively write the header at the bottom of the presently allocated paragraph space. In the embodiment illustrated, the fixed portion of the header and the Name are written in distinct steps.

In step 650, the fixed portion of the header is written. Referring to FIG. 5, the fixed portion of the header refers to the non-Name fields of the header. In step 652, the attribute bit Fixed Header Complete 508 is programmed to "0" to indicate that the fixed portion of the header has been written. In step 660, the Name is written to the header.

The header status is set in step 662. If the object is a Recovery Level 0 or 1 object (as described with respect to re-allocate), then the header status is set to Write In Progress, otherwise the header status is set to Valid. Allocation is then completed in step 690.

Figure 8:
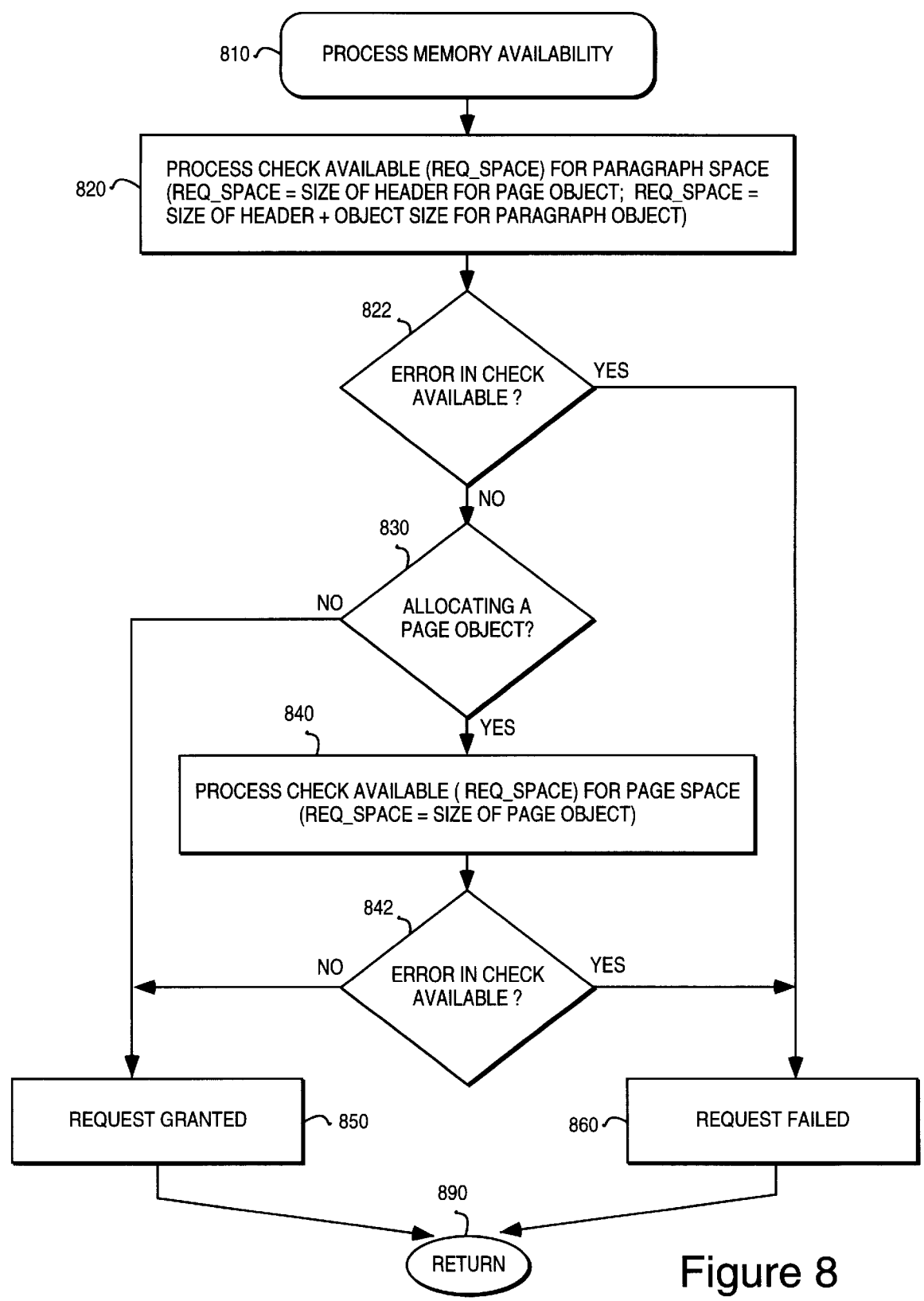
FIG. 8 illustrates a method for determining memory availability during object allocation.

FIG. 8 illustrates step 624 of FIG. 6 in greater detail. In particular, FIG. 8 illustrates a method for determining space availability within the bifurcated object space.

Generally, the non-allocated area between the bottom of allocated paragraph space and allocated page space is a free memory area (e.g., free flash pool 334) which may be allocated to either paragraph or page space. In one embodiment, however, the allocation process must adhere to a number of constraints.

One constraint is to ensure that paragraph and page objects do not share the same block. For example, if the first allocation within a block is for a paragraph object, none of the remaining space within that physical block can be allocated for page objects. Similarly, if the first allocation within a block is for a page object, none of the remaining space within that physical block is allocated for paragraph objects. Once space has been allocated for one class of object space within a physical block that physical block is not used for storing a different class of object space. In one embodiment, a block is generally available for either class of object unless space has already been allocated in the block (see, e.g., overlap of available paragraph space 454 and available page space 474 in FIG. 4).

Another constraint is to provide for a buffer between the bottom of paragraph space and the bottom of page space to demarcate the boundary between page and paragraph space. This boundary is used when scanning paragraph space for headers to determine when the end of paragraph space has been reached. In one embodiment at least one paragraph of "1"s (i.e., "FF") is reserved as a buffer between allocated page space and allocated paragraph space in order to mark the boundary between the two classes of object space. Referring to FIG. 4, this boundary is embodied as paragraph/page boundary 480 and is detailed as a component of reserved paragraph space 456.

Another constraint is to ensure that space is reserved so that objects with certain levels of update reliability can be re-allocated. FMM provides for three levels of update reliability during the re-allocation process: Recovery Level 0, 1, and 2. An object's Recovery Level is controlled by a combination of the Confidence 518 and Reserves 516 bits in the object's header.

A Recovery Level of 2 indicates that loss of the original object is acceptable during re-allocation. A Recovery Level of 1 indicates that the original object will be preserved until writing of the updated object is complete. A Recovery Level of 0 similarly indicates that the original object will be preserved until writing of the updated object is complete. A Recovery Level of 0 further ensures that sufficient reserves are maintained so that a re-allocation process can be performed on the original object as long as the second object is the same size or smaller than the original object.

Recovery Level 1 only ensures that a re-allocate operation will not be performed if there is not sufficient memory to allocate the updated object. Recovery Level 0 ensures that a re-allocate operation can always be performed for the object by reserving sufficient space so that an updated object the same size or smaller than the original object can be allocated. This reserved space is illustrated in FIG. 4 as reserved paragraph space 456 and reserved page space 476.

Reserved paragraph space 456 includes paragraph object reserves and paragraph system reserves. The paragraph object reserves are large enough to accommodate the largest paragraph object having a Recovery Level of 0 plus a header for that object. The paragraph system reserves include the paragraph/page boundary 480, room to accommodate a paragraph reclaim table, a paragraph reclaim header, and a page reclaim header. Reserved page space 476 includes page object reserves and page system reserves. The page object reserves are large enough to accommodate the largest page object having a Recovery Level of 0. The page system reserves are large enough to accommodate a page reclaim table.

Another constraint is to ensure sufficient memory always exists to perform a reclaim operation. This is accomplished through the use of system reserves within reserved paragraph space 456 and reserved page space 476. As described above, sufficient system reserves are maintained within reserved paragraph space 456 to ensure that a paragraph reclaim operation can be initiated. Similarly sufficient system reserves are maintained within reserved page space 476 to ensure that a page reclaim operation can be initiated.

No object has the use of reserved object space during initial allocation. (A Recovery Level 0 object may use reserved object space for the updated object during re-allocation). The determination of memory availability in step 624 of FIG. 6 is further detailed in FIG. 8 beginning in step 810.

For every object being allocated, step 820 ensures that sufficient availability exists in paragraph space to accommodate the object. All objects require a header in paragraph space. Thus step 820 checks the availability of the required space (REQ_SPACE) within paragraph space. In step 820, REQ_SPACE is just the size of a header for page objects. REQ_SPACE is the size of a header plus the size of the object for paragraph objects.

Step 822 determines if an error occurred when checking the availability of paragraph space. If an error occurred, then the request failed as indicated in step 860. Processing is finished in step 890.

If an error did not occur, then step 830 determines if the space is being requested for a page object. If not, then the request can be granted as indicated in step 850. Processing is then completed in step 890.

If the space is being requested for a page object, then step 840 determines if sufficient page space exists to accommodate the object. The check available process is called to determine the availability of REQ_SPACE within page space. In this case REQ_SPACE is the size of the page object.

If 842 detects that an error occurred in step 842 then the allocation request has failed as indicated in step 860. Otherwise the allocation request can be granted as indicated in step 850. Once the request is granted or failed, memory availability processing is completed in step 890.

Figure 9:
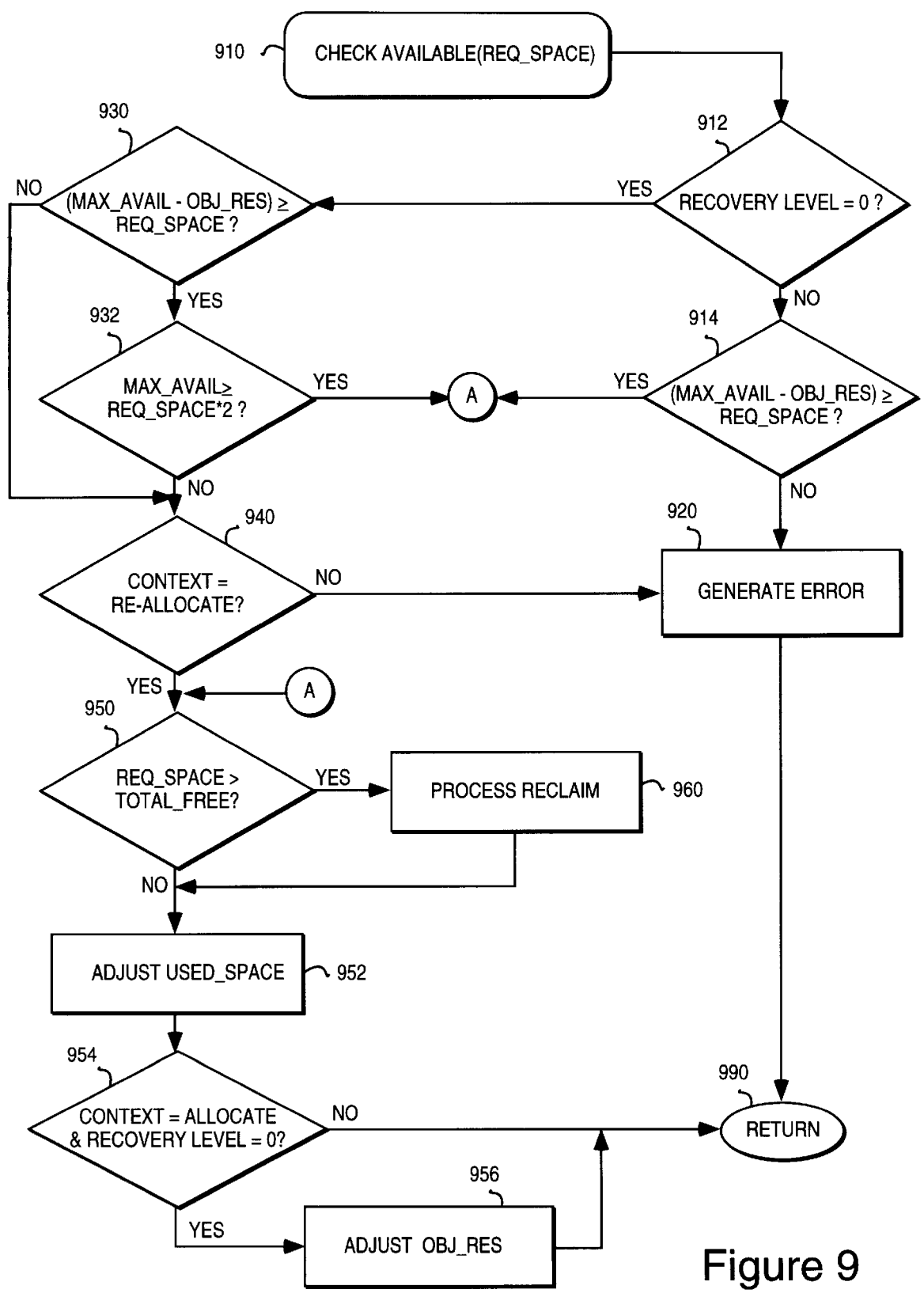
FIG. 9 illustrates a detailed method for checking availability of a requested page or paragraph space during allocation.

FIG. 9 illustrates the check availability process of steps 820 and 840 in FIG. 8 in greater detail beginning with step 910. A common flowchart is used to describe the check availability process for both paragraph and page objects. The variables used correspond to the specifics of the class of object space being requested and not a total within all of managed object space. For example, during a paragraph object availability check "OBJ_RES" refers to the paragraph object reserves only. Similarly during a page object availability check, OBJ_RES refers to the page object reserves only.

The variables MAX_AVAIL, OBJ_RES, TOTAL_FREE, and USED_SPACE are defined as follows. MAX_AVAIL is the total amount of space for the selected object class that could be allocated to objects (and associated headers if appropriate) after a reclaim operation less any system reserves.

OBJ_RES is the size of the object reserves for the selected class of object. USED_SPACE is the space consumed by system reserves, valid objects and associated headers, if appropriate.

TOTAL_FREE is MAX_AVAIL less the space used by de-allocated objects and headers if appropriate.

Step 912 determines whether the allocation request is for a Recovery Level 0 object. If the object is not a Recovery Level 0 object, then the allocation request cannot use object reserves. Step 914 determines if MAX_AVAIL less OBJ_RES is sufficient to accommodate REQ_SPACE. If so, then the allocation request will be granted and processing continues with step 950. If not, an allocation error is generated in step 920 and availability checking is completed in step 990.

If step 912 determines that the allocation request is for a Recovery Level 0 object, then step 930 determines if (MAX_AVAIL−OBJ_RES) is greater than or equal to REQ_SPACE. If not then processing continues in step 940. If so, then step 932 determines if sufficient space exists (including objects reserves) to accommodate allocating this object and subsequently allocating another object of the same size. Step 932 determines if MAX_AVAIL≧REQ_SPACE*2. If not, processing continues in step 940, otherwise the request can be granted and processing continues with step 950.

Step 940 determines if this allocation is an original allocation request or if the allocation request was initiated during the re-allocation process. If the context of the allocation request is re-allocate, then sufficient space was reserved for the object at original allocation and thus the request can be granted by continuing with step 950. Otherwise, if the context is not re-allocate, then an allocation error is generated in step 920 and availability checking is finished in step 990.

Step 950 tests to determine if REQ_SPACE is greater than TOTAL_FREE. If so, then a reclaim operation must be performed in order to free up object space used by de-allocated objects. Otherwise the space used by the de-allocated objects is not necessary since the requested space is fully accommodated by the remaining free space. A call to initiate the reclaim process is issued in step 960.

Step 952 adjusts a USED_SPACE variable. Adjusting the USED_SPACE variable prevents subsequent allocation requests from using the space being granted. This ensures that the current object will, in fact, be able to subsequently be allocated.

Step 954 determines if the request is an original allocation request for a Recovery Level 0 object. If so, then object reserves may need to be adjusted as indicated in step 956. Otherwise check availability processing is completed in step 990.

In step 956, the present object may be larger than any other previously allocated Recovery Level 0 object. If so then the object reserves for this class of object space must be increased. After adjusting the object reserves in step 956 (if necessary) check availability processing is completed in step 990.

B. Writing

Figure 10:
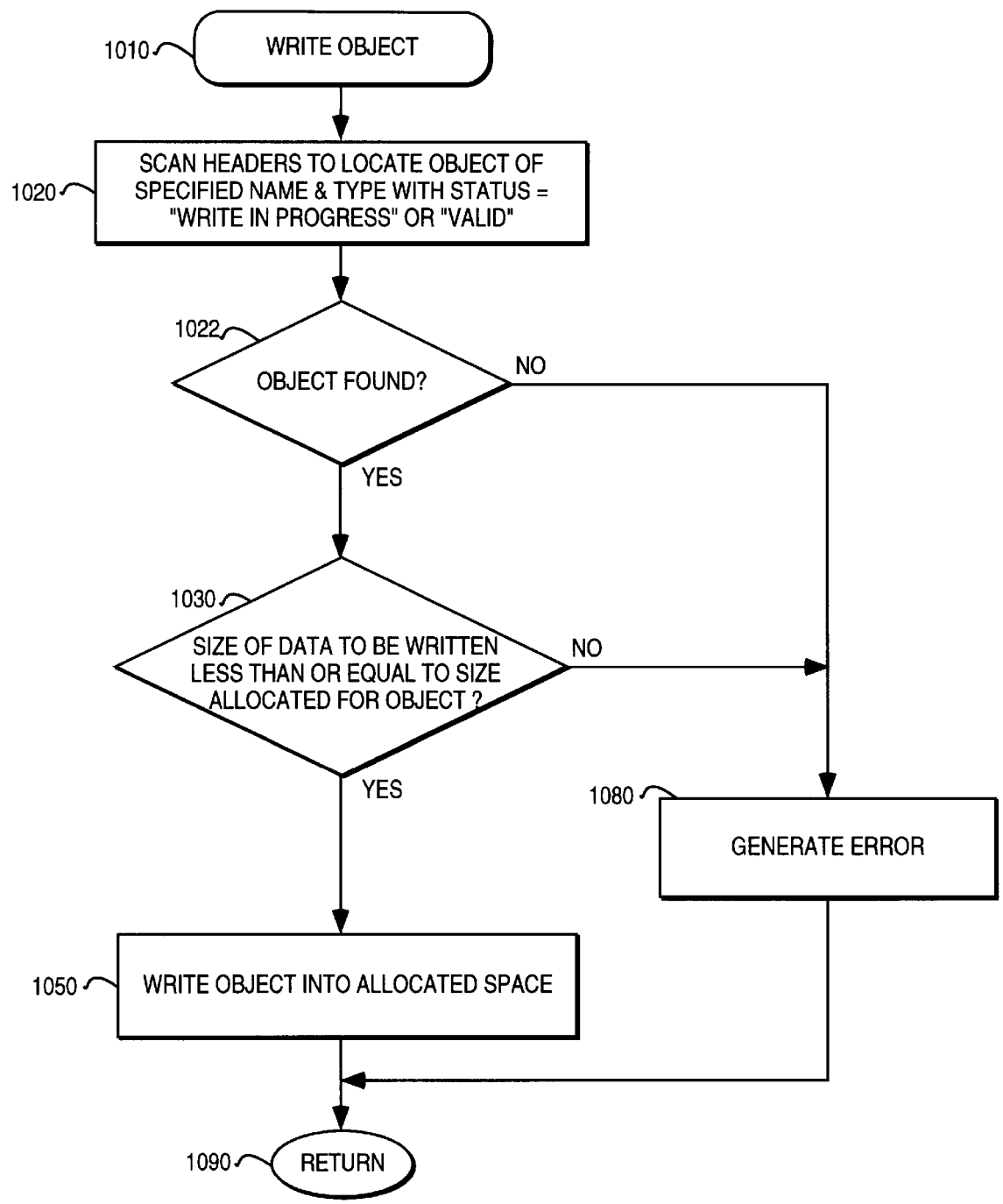
FIG. 10 illustrates a method for writing an object into space allocated for the object.

FIG. 10 illustrates a flowchart for writing an object in managed object space beginning with step 1010.

In step 1020, the headers are scanned to locate an object of a specified Name and Type having a status of Write In Progress or Valid. Step 1022 determines if such an object is found. If no such object is found, then an error is generated in step 1080 and processing is completed in step 1090. A write operation can only be performed on previously allocated space.

If the object is found in step 1022, then error checking is performed in step 1030. Step 1030 determines whether the size of the data to be written is less than or equal to the size allocated for the object.

When writing an object to allocated space, there is no requirement that the object (i.e., the information or data being stored) consume all of the allocated space. If, however, the size of the data to be written exceeds the space allocated for the object then an error is generated in step 1080 and the write object process is finished without writing anything in step 1090. In an alternative embodiment, FMM truncates the data to be written instead of generating an error.

If the size of the data to be written does not exceed the space allocated for the object, then step 1050 writes the object into its associated allocated space. The write process is then completed in step 1090.

Referring to FIG. 4, paragraph space is allocated contiguously proceeding from the top of managed object space to the bottom of managed object space. Page space is allocated contiguously proceeding from the bottom of managed object space to the top of managed object space. The "top" and "bottom" of an allocated space varies in accordance with the class of the object.

In one embodiment, an object is always written contiguously proceeding toward the top of managed object space. In one embodiment the bottom of managed object space has a lower memory address than the top of managed object space. This method of writing ensures that objects are always written beginning at a lower address and proceeding to a higher address.

In other words, space is allocated contiguously from the top of paragraph or page space towards the bottom of paragraph or page space, respectively. Data is always written within an allocated space proceeding towards the top of managed object space. Thus paragraph data is written beginning at the bottom of the specified allocated space and proceeding towards the top of managed object space. Similarly page data is written beginning at the top of the specified allocated space and proceeding towards the top of managed object space (e.g., see FIG. 22). If the top of managed object space has a higher address than the bottom of managed object space, this approach ensures that objects are always written beginning at a lower address and proceeding towards a higher address independently of the class of the object.

After the object has been written, the process of writing the object is completed in step 1090.

A valid second object having a same Name and Type as a valid pre-existing first object may be created during the re-allocate process. The header for the first object will have a status of Valid. The header for the second object will have a status of Write In Progress until the writing of the second object is completed. FMM uses a Write Complete function to invalidate one of the two objects. The Write Complete function is also used to set the status of Recovery Level 0 and 1 objects to Valid.

Figure 11:
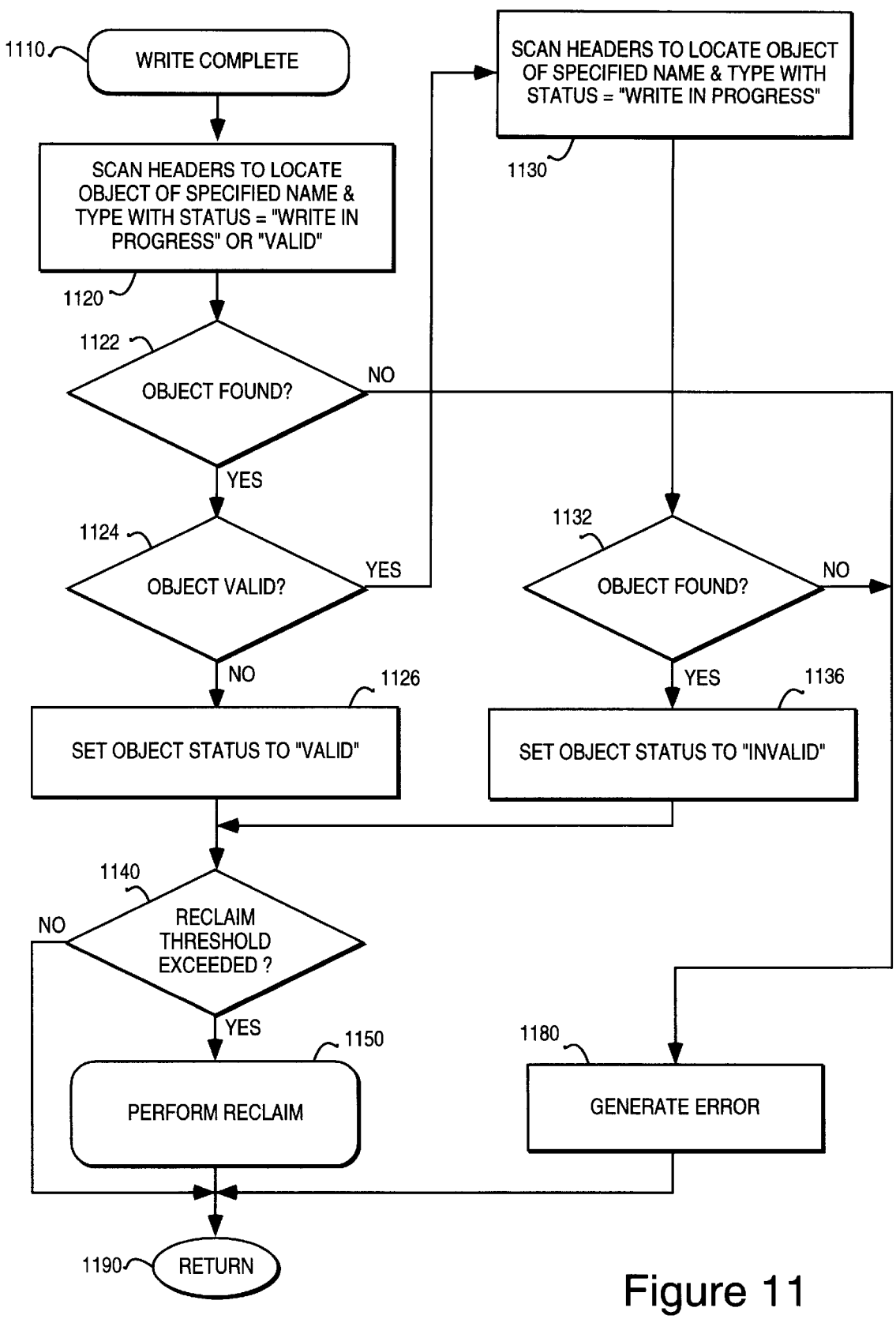
FIG. 11 illustrates a method for changing an object's status to indicate that write operations are finished with respect to that object.

FIG. 11 illustrates the Write Complete process beginning in step 1110. In step 1120, the headers are scanned to locate an object of specified Name and Type having a status of Write In Progress or Valid. Step 1122 determines if such an object is found. If the object is not found, then an error is generated in step 1180 and the Write Complete function is finished in step 1190.

If the object is found, step 1124 determines whether the status is Write In Progress or Valid. If the status is other than Valid, then the status is set to Valid in step 1126 and processing continues in step 1140.

If the status is determined to be Valid in step 1124, then processing continues in step 1130. Step 1130 scans headers to locate an object of the specified Name and Type having a status of Write In Progress. Step 1132 determines if such an object exists. If the object is not found, then an error is generated in step 1180 and the process is completed in step 1190.

If the object is determined to exist in step 1132 then the status of the object is set to Invalid. Processing continues in step 1140.

Once the status has been properly set in either step 1126 or 1136, step 1140 determines if a reclaim threshold has been exceeded. In one embodiment, the reclaim threshold is a measure of the total amount of space consumed by invalid objects versus the total amount of memory in managed object space. In an alternative embodiment, the reclaim threshold is a measure of the total amount of space consumed by invalid objects versus the total amount of free space and reclaimable space (i.e., space allocated to invalid objects). Once this threshold is crossed a reclamation operation is performed in step 1150. From either step 1140 or step 1150, the Write Complete process is finished in step 1190.

C. Reading

Figure 12:
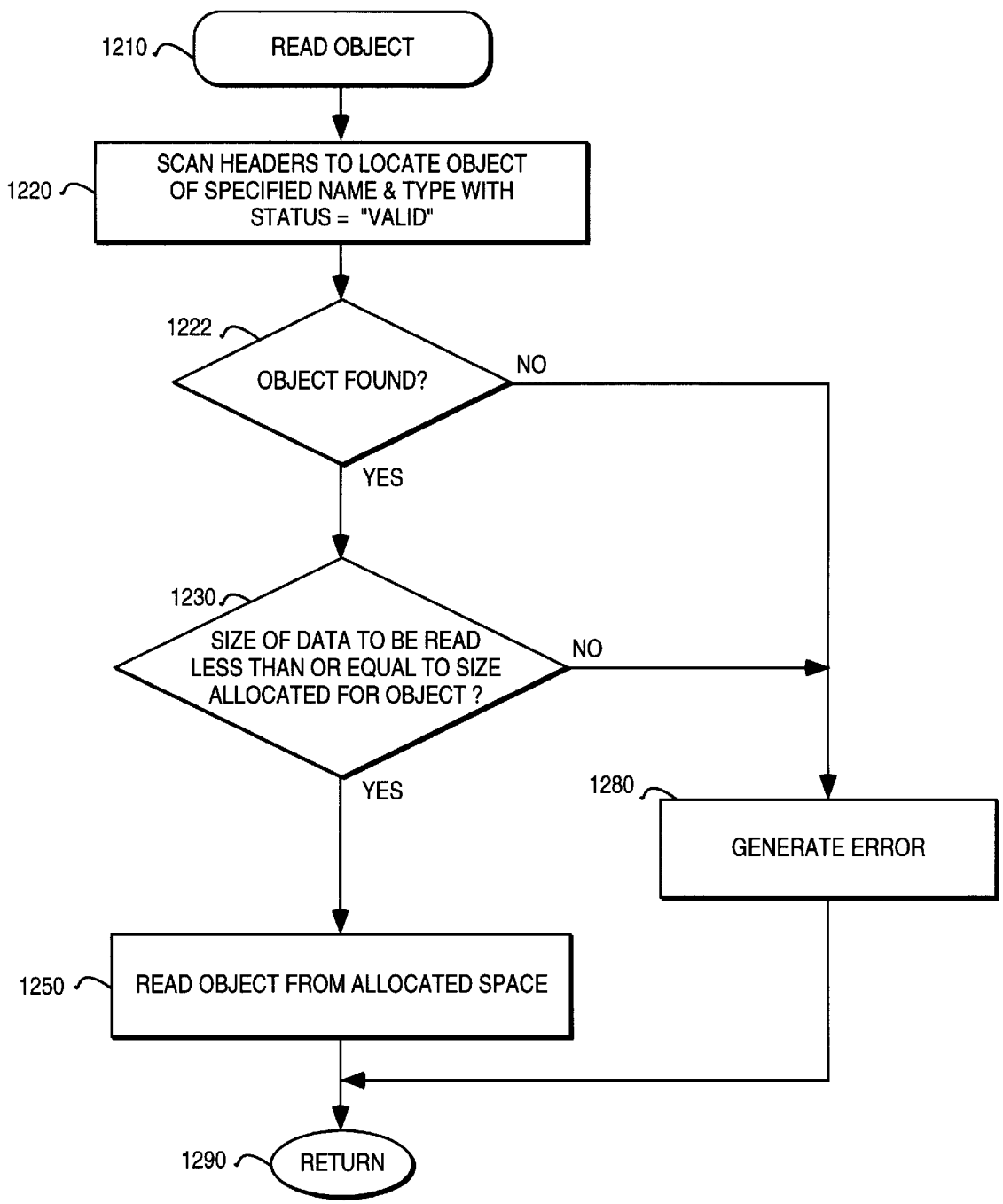
FIG. 12 illustrates a method for reading an object.

The process of reading an object is illustrated in FIG. 12 beginning with step 1210. In order to read an object, the object must be identified by Name and Type.

In step 1220, paragraph space is scanned to locate a header identifying a valid object of the specified Name and Type. Step 1222 determines whether such an object was found. If no such object is found then an error is generated in step 1280 and the read object process is finished in step 1290.

In one embodiment, an amount to be read is provided with the read request. If step 1222 determines the object is found, then the read process ensures that the size of the data requested is less than or equal to the space allocated for the object in step 1230. If the read request is requesting data beyond what is allocated for the object, then an error is generated in step 1280 and the read process is completed in step 1290.

Alternatively, if the size of the data requested is less than or equal to the space allocated for the object, then processing continues from step 1230 to read the object in step 1250. For paragraph objects, the allocated space is of a size indicated by Size (i.e., 530 and 520) and is located immediately after the header. For page objects, the allocated space is also of a size indicated by Size. The location of the allocated space, however, is determined by adding the Size field of all "non-absorbed" page headers preceding the header of the object being read. "Non-absorbed" refers to the state of the "Absorbed" bit in the object's header. The use of the Absorbed field is described in greater detail with respect to the reclamation process.

After reading the object in step 1250, the read object process is completed in step 1290.

D. De-allocation

When a request to delete an object is received, FMM marks the object for deletion instead of immediately reclaiming the space used by the object. De-allocation is accomplished by marking the status of an object's header as Invalid. De-allocated space cannot be re-used until reclamation of the object occurs.

Figure 13:
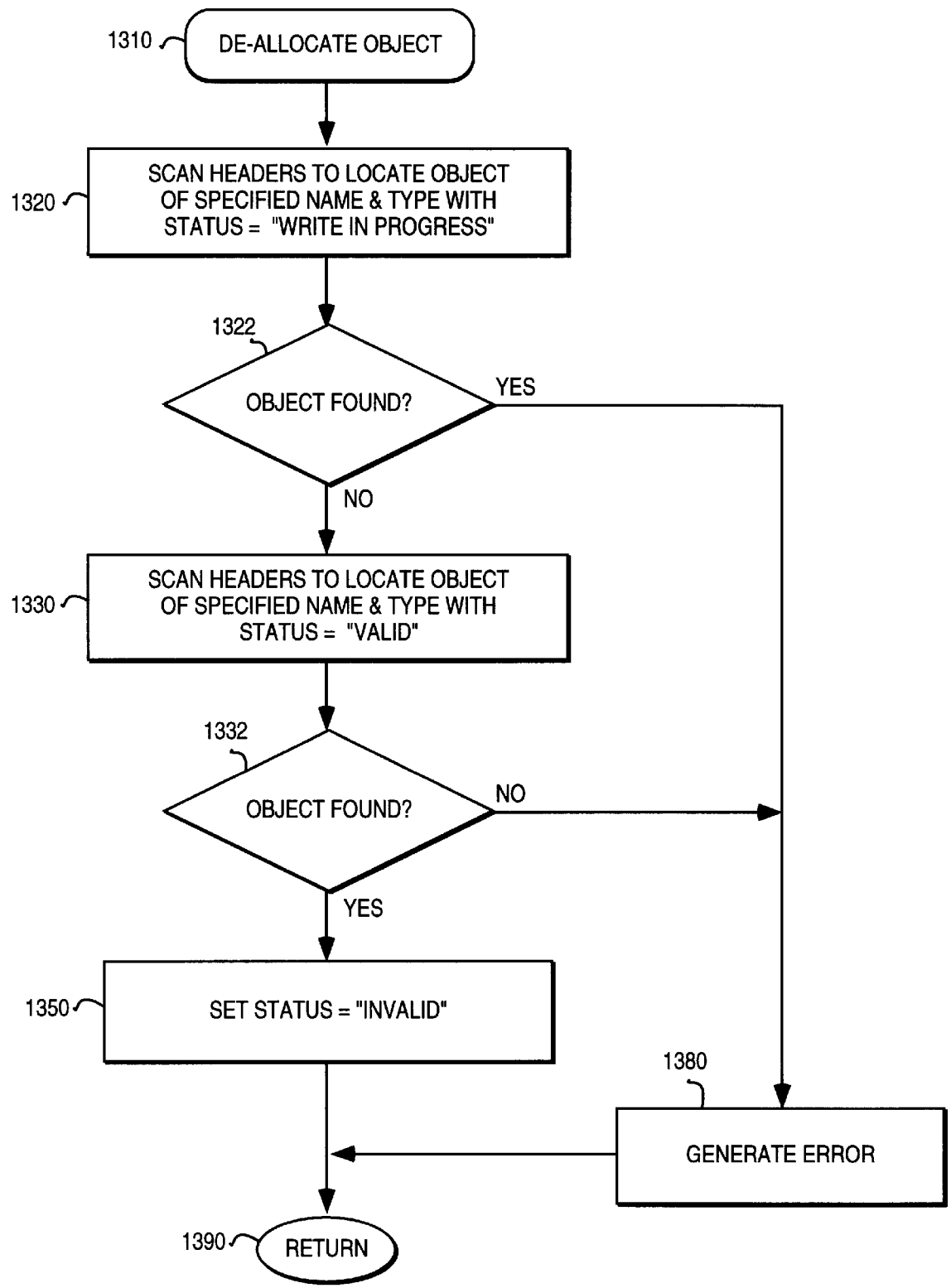
FIG. 13 illustrates a method for de-allocating an object.

FIG. 13 illustrates the de-allocation process beginning with step 1310. In one embodiment, objects that are being re-allocated are not eligible for de-allocation until the re-allocation process is complete. In addition, objects which have not been completely written (e.g., allocating Recovery Level 0 or 1 objects without calling Write Complete) cannot be de-allocated.

A request to de-allocate an object must identify the object by Name and Type. In step 1320, the headers are scanned to locate an object having the specified Name and Type with a status of Write In Progress. Step 1322 determines if such an object is found. If an object having the specified Name and Type and status is found then an error is generated in step 1380 and de-allocation processing is completed in step 1390.

If step 1322 determines the object was not found processing continues with step 1330. In step 1330 the headers are scanned to locate an object having the specified Name and Type with a status of Valid. Step 1332 determines if such an object is found. If an object having the specified Name and Type and status is not found then an error is generated in step 1380 and de-allocation processing is completed in step 1390.

If step 1332 determines the object was found processing continues in step 1350. In step 1350, the valid object identified by the specified Name and Type is de-allocated by setting the status of the associated header to Invalid. De-allocation processing is then completed in step 1390.

Thus in one embodiment, objects are de-allocated only after locating a valid object of the specified Name and Type after 1) determining that the object is not being written and 2) determining that the object is not being re-allocated.

E. Re-allocation

Figure 14:
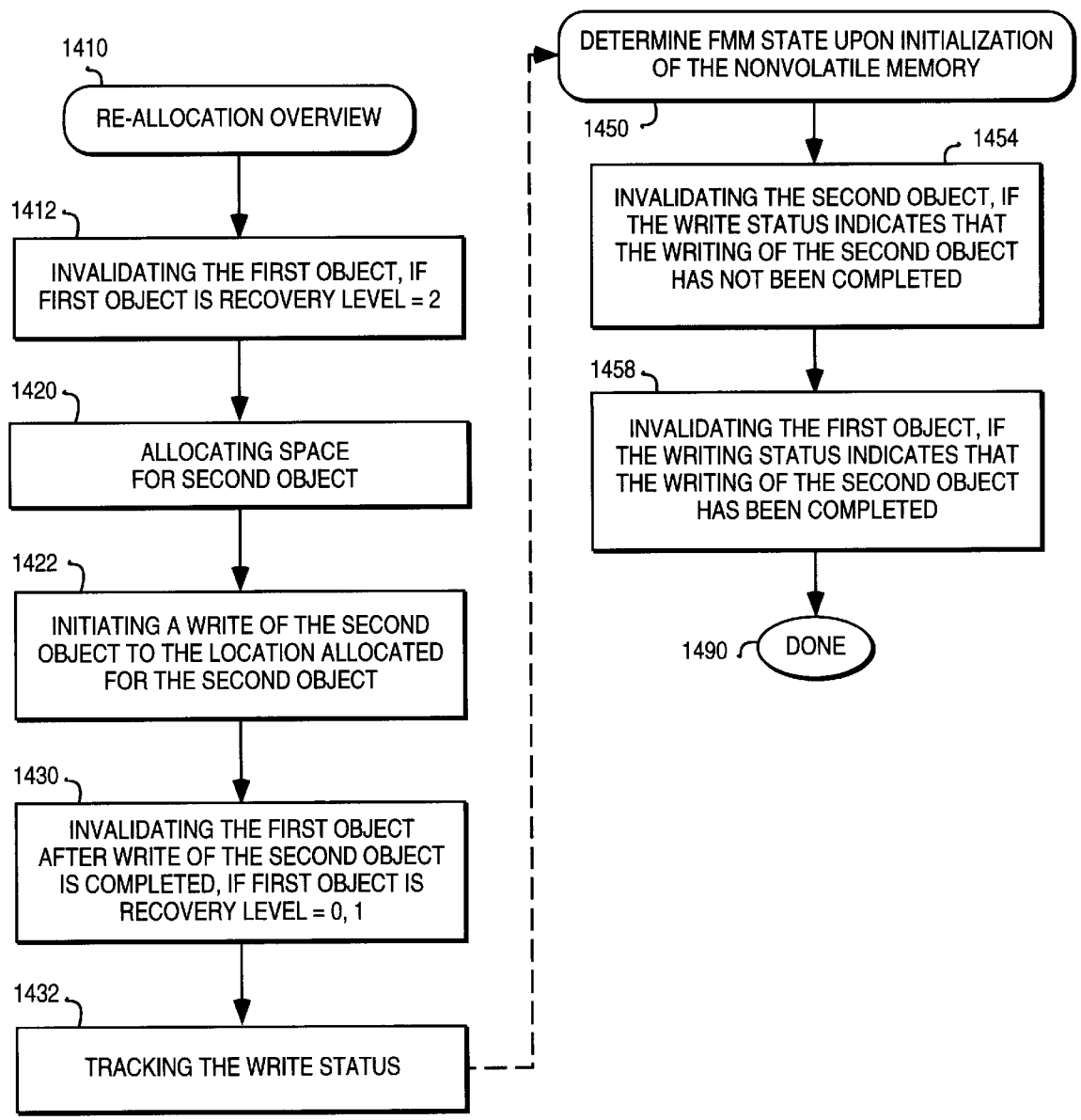
FIG. 14 illustrates the overview of the reliable re-allocation process.
Figure 15:
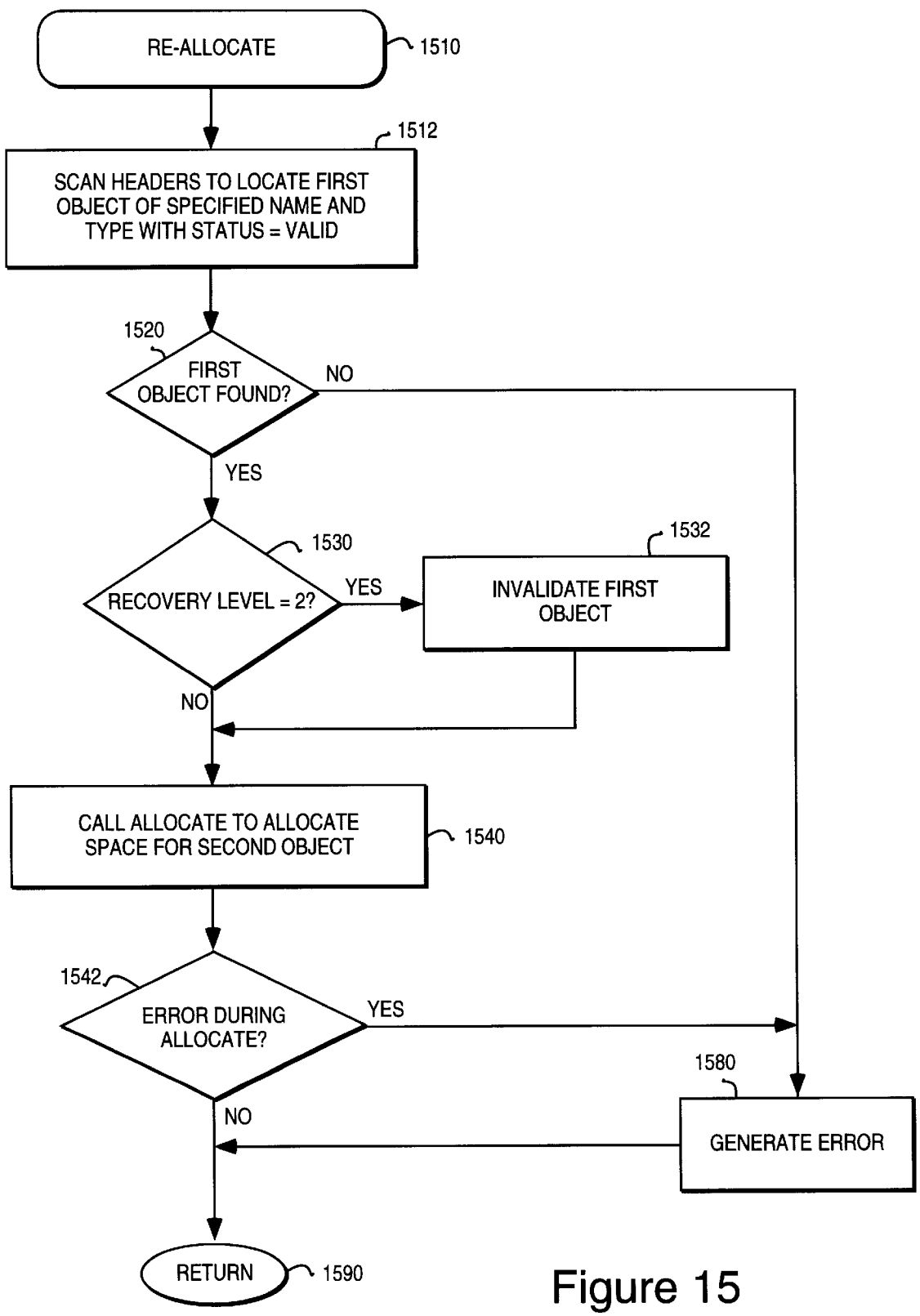
FIG. 15 illustrates the dynamic re-allocation process.

FIGS. 14–15 are associated with the re-allocation process. Re-allocation is useful for updating or replacing an object that already exists within the managed object space.

In one embodiment, an object is re-allocated into the same object space it was previously allocated into. This type of re-allocation is referred to as a static re-allocation. Static re-allocation erases the identifiable area of memory associated with the object so that data may subsequently be written to the same identifiable area of memory. Static re-allocation thus permits rewriting an object in place.

In an alternative embodiment, an object can be re-allocated into a different object space than it was previously allocated into. This type of re-allocation is referred to as a dynamic re-allocation.

Static re-allocation requires erasing the identifiable area of memory presently associated with the object. Additional overhead incurred to achieve reliable updates includes the additional step of creating a duplicate of the original object. In one embodiment, the duplicates are created at the bottom of the object space that the first object resides in. After a successful update, the duplicate is invalidated. Otherwise, the duplicate is available to restore to the identifiable area of memory associated with the original object. The result is that static re-allocation leaves de-allocated objects at the bottom of the object space rather than interspersed throughout the object space.

Disadvantages of static re-allocation include the length of time required to create the duplicate and to erase the area of memory used by the original object so that it can be updated. Advantages include a tendency to reduce the amount of compaction that must be performed during the reclamation process and the limitation that the updated version must fit within the same space allocated to the original.

In one embodiment, dynamic re-allocation allocates space for the updated version of the object at the bottom of the object space. If reliability is desired the original version is available throughout the process. If reliability is not desired then the original version can be invalidated at the beginning of the process to provide the ability to recover more memory if reclamation is required to allocate the new space. The result is that dynamic re-allocation tends to leave invalidated objects interspersed throughout the object space.

Disadvantages of dynamic re-allocation include the length of time that may be required to perform a reclamation due to the amount of compaction required. Given that dynamic re-allocation does not require erasure of the original area of memory or the creation of duplicate versions of the object, dynamic re-allocation tends to offer a substantial improvement in the speed of executing each re-allocation at the cost of increasing the time to perform a reclaim operation. Thus dynamic re-allocation is faster if no reclaim is required during re-allocation, but may be slower if the re-allocation must include reclamation. Another advantage is that header attributes may be changed because dynamic re-allocation does not need to use the same header for the updated version of the object. This permits, for example, the updated version of the object to have more or less space allocated than what the original version of the object required. Thus dynamic re-allocation also tends to provide more efficient memory allocation than static re-allocation if the embodiment provides for the ability to allocate a different amount of space for the object during re-allocation.

FIGS. 14–15 are directed towards dynamic re-allocation of a first object with a second object beginning with step 1410. In step 1412, the first object is invalidated if the first object has a recovery level of 2. In order to free enough space to allocate the second object in step 1420, the allocation process may have to perform a reclamation. Invalidating the first object permits the allocation process to recover the space presently used by the first object, if necessary. Thus recovery level 2 may be used if the loss of the first object is of no consequence.

In step 1420, space is allocated for the second object. After allocation the write status of the second object will be Write In Progress for objects having a Recovery Level of 0 or 1. Objects having a Recovery Level of 2 will have a Valid write status after allocation. Writing of the second object is then initiated in step 1422.

In step 1430, the first object is invalidated after completing the writing of the second object, if the first object has a Recovery Level of 0 or 1. Step 1432 indicates that the status of writing the second object is tracked.

The dotted line between 1432 and 1450 is intended to emphasize that a power loss or other failure may occur during or between any of steps 1410 through 1432, and not just after 1432. Steps 1410 through 1432 reflect the re-allocation process as if each of the proceeding steps is completed. Thus the FMM state is determined upon initialization of the nonvolatile memory regardless of the previous performance of steps 1410 through 1432.

The state of the FMM is determined upon initialization of the nonvolatile memory as indicated in step 1450. Steps 1454 through 1458 handle errors that can occur during the re-allocation process. In particular, the error recovery procedures handle an interruption such as a power loss or other failure occurring during or between any of steps 1422 through 1432. Error handling for steps 1412 through 1420 is handled by other recovery procedures (i.e., allocation recovery) or ignored.

If the second object is a Recovery Level 0 or 1 object, its write status will be Write In Progress until the status is changed by calling the Write Complete function. The Write Complete function changes the write status from Write In Progress to Valid. If the FMM locates an object having a write status of Write In Progress, then FMM assumes that writing of the object was initiated but not completed. Given that only Recovery Level 0 and 1 objects can have a write status of Write In Progress, the object must be invalidated because its reliability is indeterminate. Thus in step 1454, the second object is invalidated if the write status of the second object is Write In Progress.

If an error occurs before step 1430 is completed there may be duplicate objects having a write status of Valid. If this is the case, then the first object is invalidated in step 1458. The existence of objects having the same Name and Type indicates that a re-allocation of an object having a Recovery Level of 0 or 1 was in progress at the time of the failure. Given that the second object is Valid, the second object represents a valid update of the first object. Thus the first object is invalidated.

After handling duplicate valid objects (step 1458) and objects with a status of Write In Progress (step 1454), re-allocation error handling is completed in step 1490.

FIG. 15 illustrates the dynamic re-allocation process beginning with step 1510. Objects to be re-allocated are uniquely identified by Name and Type. In order to re-allocate an object the object must be pre-existing. Thus step 1512 scans the headers to locate a first object of specified Name and Type with a status of Valid.

Step 1520 determines if the specified object was found. If not, then an error is generated in step 1580 and re-allocation ends with step 1590. Alternatively, if the specified object is found processing continues with step 1530.

Step 1530 determines if the first object has a Recovery Level of 2. If so then the first object is invalidated in step 1532 before proceeding to step 1540. Otherwise processing continues in step 1540.

Step 1540 attempts to allocate space for the second object. If step 1542 determines no errors occurred during allocation then the FMM portion of re-allocation is completed in step 1590. Otherwise an error is generated in step 1580 before finishing in step 1590.

Once space has been allocated for the second object, the Write function illustrated in FIG. 10 can be used to write the second object into the space allocated for the second object. For Recovery Level 0 and 1 objects, Write Complete must subsequently be called to change the status of the second object from Write In Progress to Valid. The Valid status indicates to FMM that writing of the second object is completed.

Figure 27:
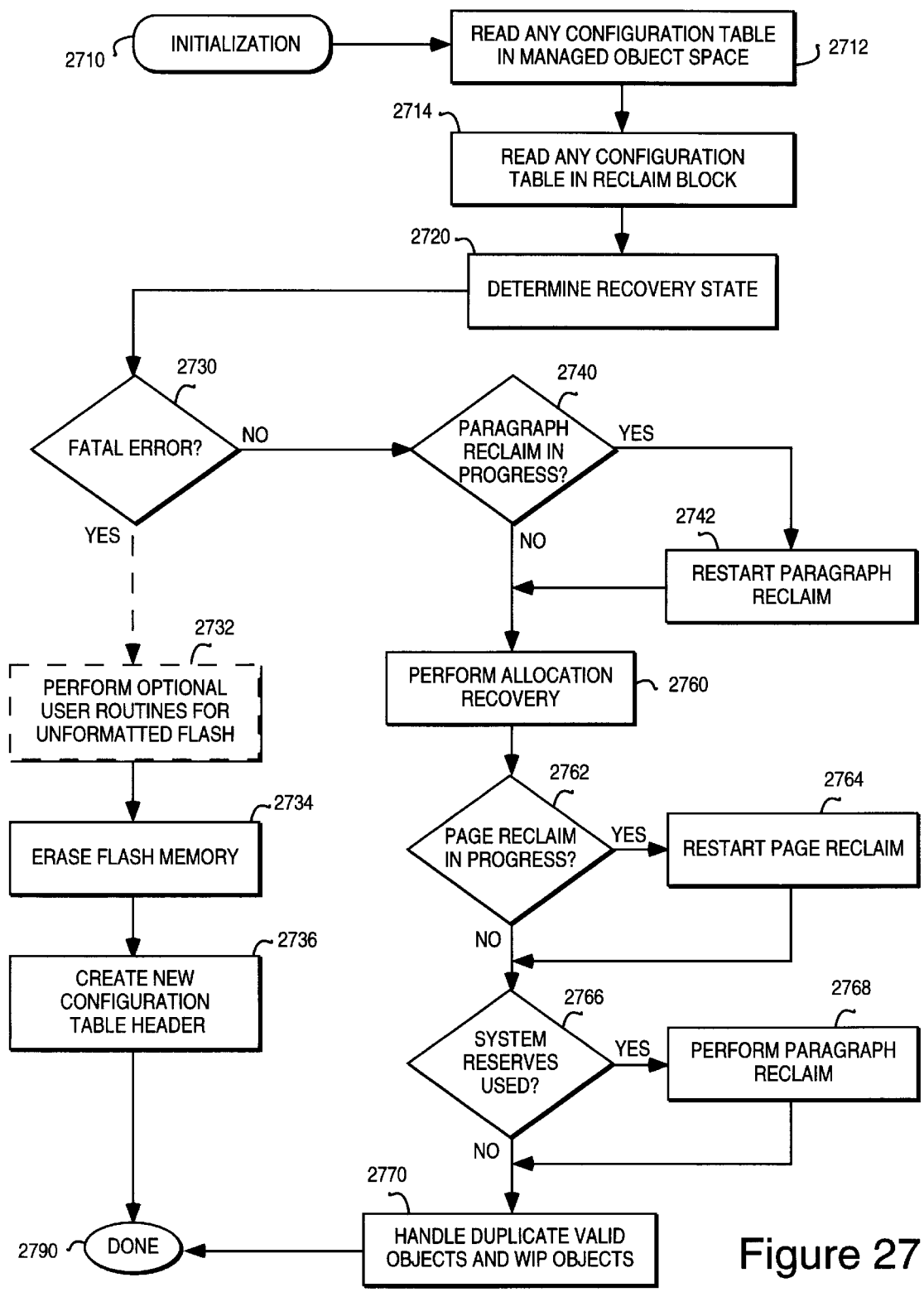
FIG. 27 illustrate a method of initializing the FMM.
Figure 29:
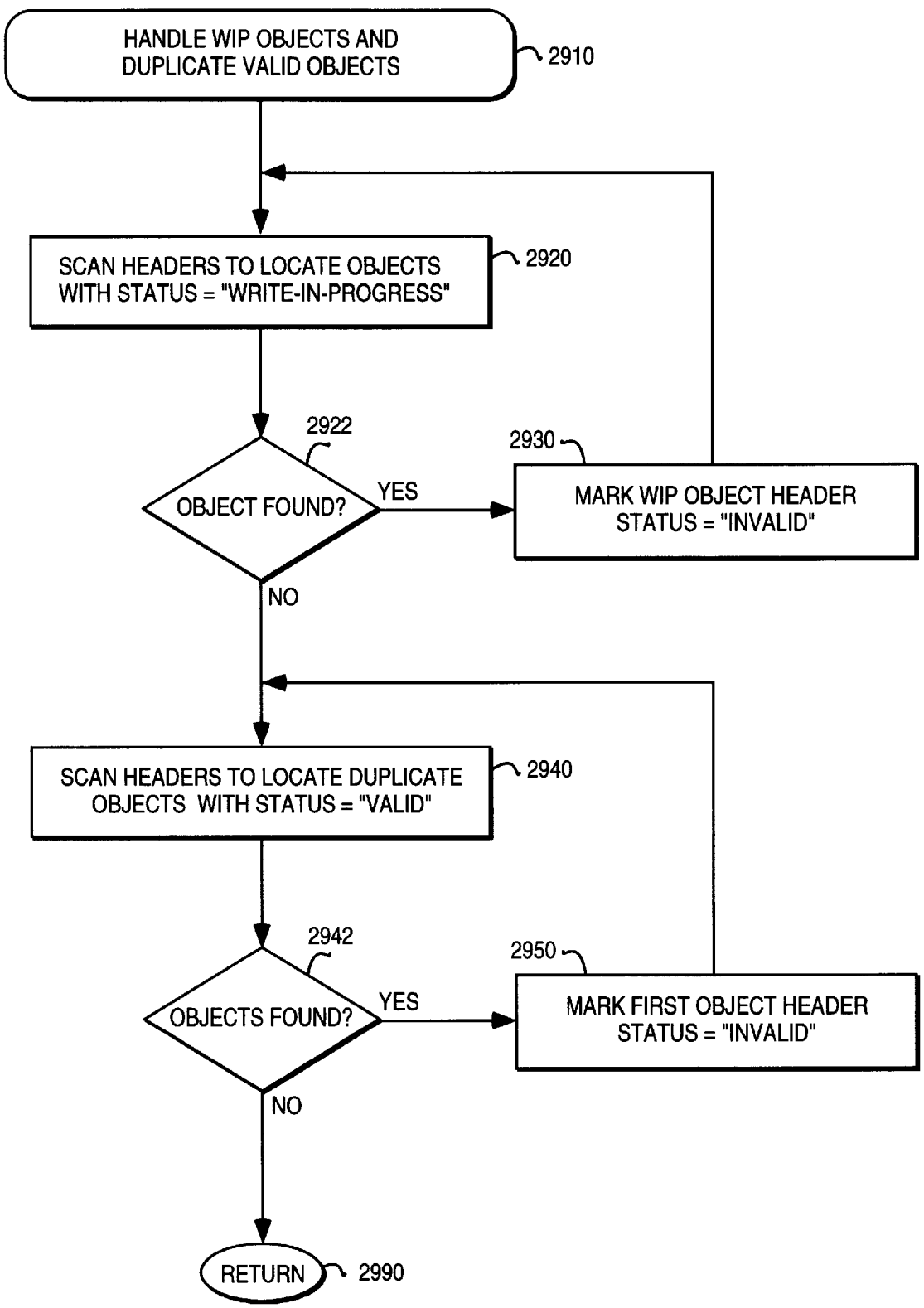
FIG. 29 illustrates a method of recovering from errors that may have been generated during the re-allocation process.

Recovery procedures as set forth in steps 1450 through 1458 of FIG. 14 are discussed in further detail with respect to FIG. 29 and step 2770 of FIG. 27.

F. Reclamation

Reclamation is the process of freeing up memory associated with de-allocated objects. This requires erasing the space associated with de-allocated objects. Referring to the values for the header Status 506, the space identified as bad or invalid is typically referred to as "dirty" space. In one embodiment, reclamation is performed once a reclamation threshold is reached.

In order to ensure reliable updates, the FMM must be able to recover at any point during the reclamation process. Thus if power is lost during a reclaim operation, the FMM 1) detects that a reclaim operation was in progress and 2) completes the process without the loss of valid data.

The reclaim process uses a reclaim table to track the reclaim process of each block being reclaimed. The reclaim table is allocated at the bottom of the object space being reclaimed. Thus if page reclamation has been initiated, a reclaim table header is stored at the bottom of paragraph space and the reclaim table is stored at the bottom of page space. The reclaim table is stored immediately after the reclaim table header in paragraph space, if paragraph reclamation has been initiated.

Reclamation effectively compacts object space. As the space used by de-allocated objects is made available, subsequent objects of the same class are moved towards the top of that class of object space to maintain contiguity.

The FMM avoids the use of physical object addresses and relies on the known size and contiguity of objects to locate other objects. The gaps destroy the contiguity and thus prevent the FMM from locating objects without the aid of other tracking mechanisms. In one embodiment, the FMM uses additional data structures within the nonvolatile memory to track the reclamation process.

Figure 16:
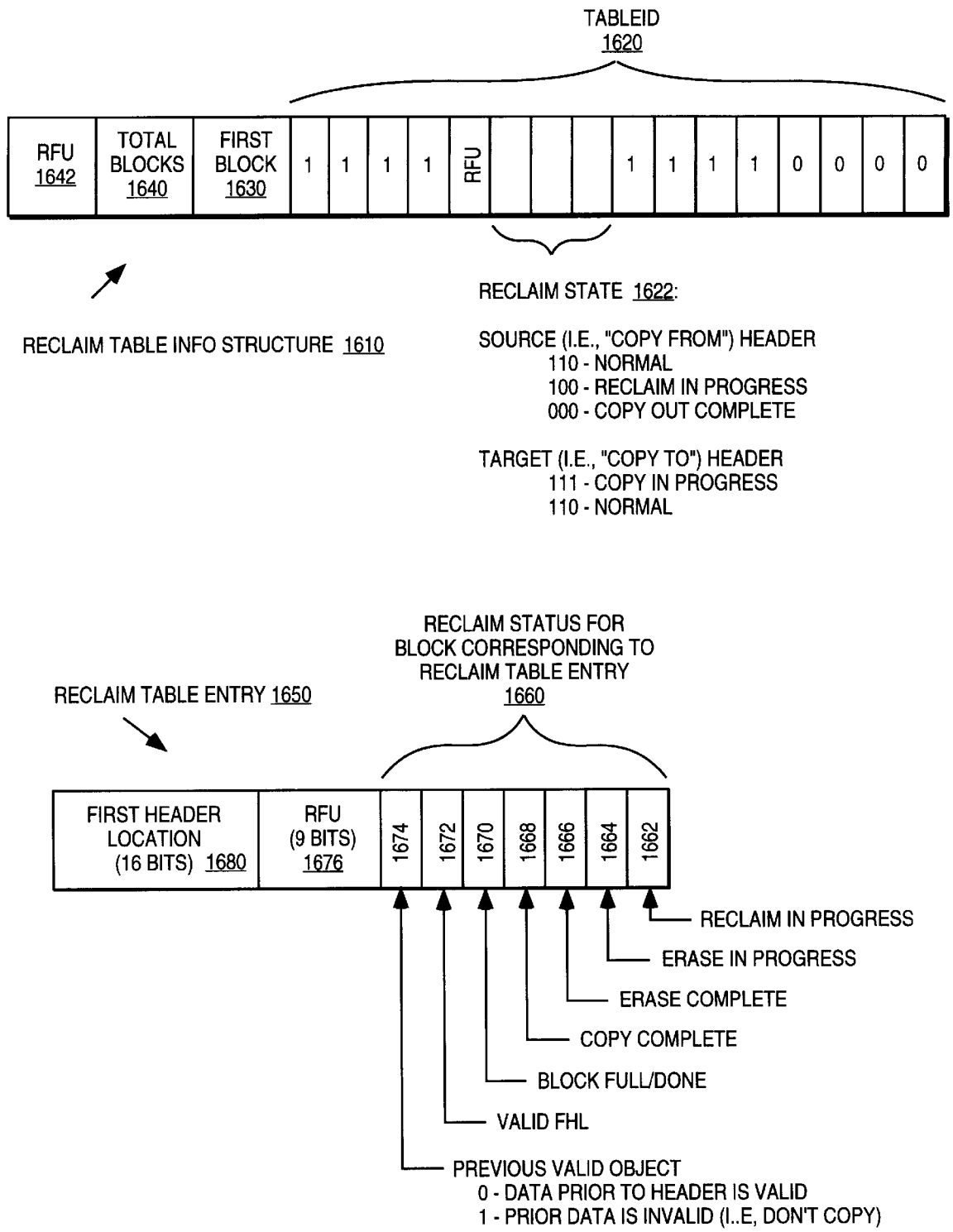
FIG. 16 illustrates the data structures for a reclaim table including a table info structure and a reclaim table entry.

FIG. 16 illustrates the data structures for the components of the reclaim table. The reclaim table includes a reclaim table info structure 1610. The reclaim table also includes a reclaim table entry 1650 for each block to be reclaimed (including the blocks containing the reclaim table).

The reclaim table info structure 1610 has a unique Table ID 1620 that helps to authenticate the reclaim table info structure. In one embodiment Table ID 1620 is "0xFXF0" ("X" means "don't care"). First Block 1630 indicates the first block to be reclaimed. Total Blocks 1640 indicates the total number of blocks to be reclaimed.

Each block being reclaimed has a corresponding reclaim table entry 1650 in the reclaim table. Reclaim status 1660 indicates the status of a reclaim for the block corresponding to the reclaim table entry 1650.

Paragraph reclamation requires additional tracking mechanisms to ensure the ability to recover from reclamation in the event of an interruption such as a power failure. Paragraph reclamation, must compact the data as well as the headers towards the top of paragraph space. This tends to create "gaps" in continuity during paragraph reclamation even though headers and objects are contiguous upon completion of the operation. These gaps prevent the FMM from being able to traverse paragraph space to locate objects by proximity. Given that the paragraph reclaim table is located in paragraph space, a second data structure referred to as a configuration table is used to track the location of the paragraph reclaim table.

The configuration table is allocated at a known location so that it can be located upon initialization of the nonvolatile memory. In order to ensure contiguous paragraph objects, the configuration table and its associated header are located at the top of paragraph space. This permits locating the configuration table (and thus the paragraph reclaim table) regardless of the gaps created within paragraph space during the reclaim operation. When initially allocated, the configuration table provides for a pre-determined number of paragraph reclaim operations before the block containing the configuration table itself must be reclaimed.

Page reclamation has the advantage that no gaps develop within paragraph space and thus the paragraph space may be traversed to locate page objects at any point during page reclamation.

Figure 17:
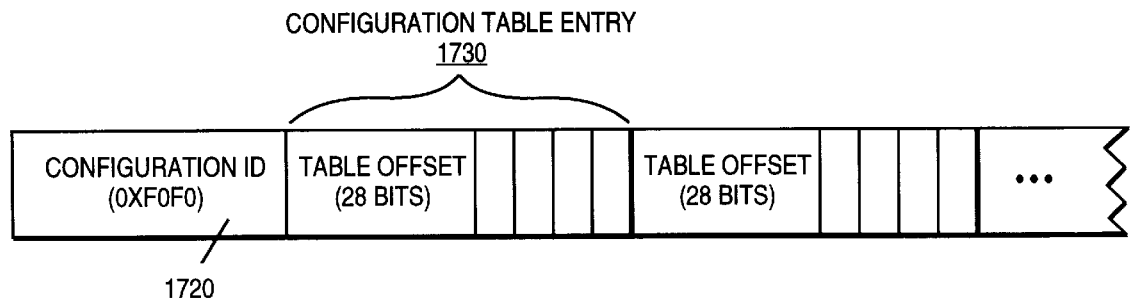
FIG. 17 illustrates a configuration table data structure.
Figure 17:
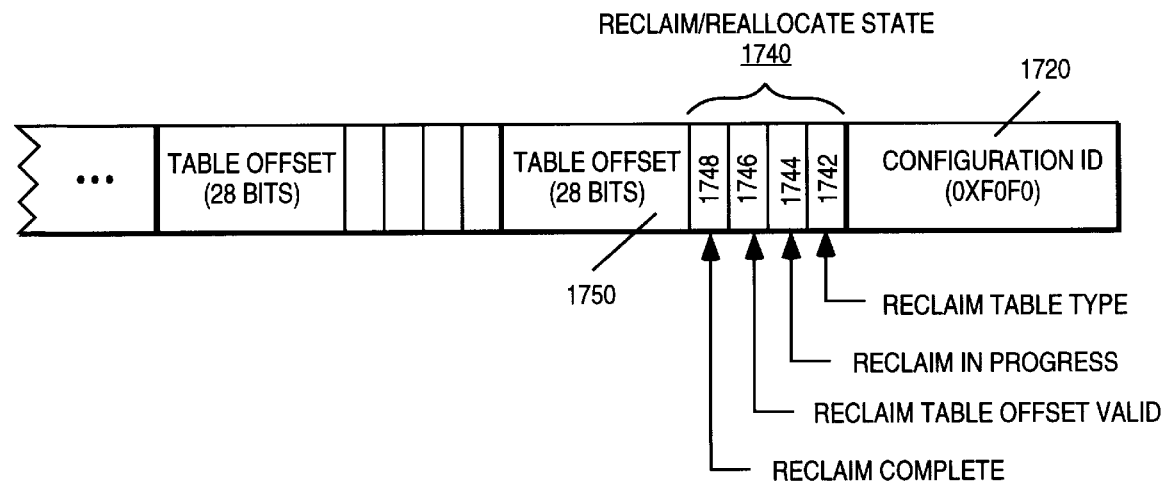

FIG. 17 illustrates one embodiment of a data structure for the configuration table. The configuration table includes a Configuration ID 1720 of "0xF0F0" that is used to authenticate the configuration table. The configuration table includes a plurality of configuration table entries such as configuration table entry 1730. Each configuration table entry 1730 provides for a Table Offset 1750 and a series of status fields 1740 for indicating the progress of a reclaim operation. In an alternative embodiment, the same fields are used when performing a static re-allocation and thus are referred to collectively as Reclaim/Re-allocation State 1740. The configuration table is not required for dynamic re-allocation.

Figure 18:
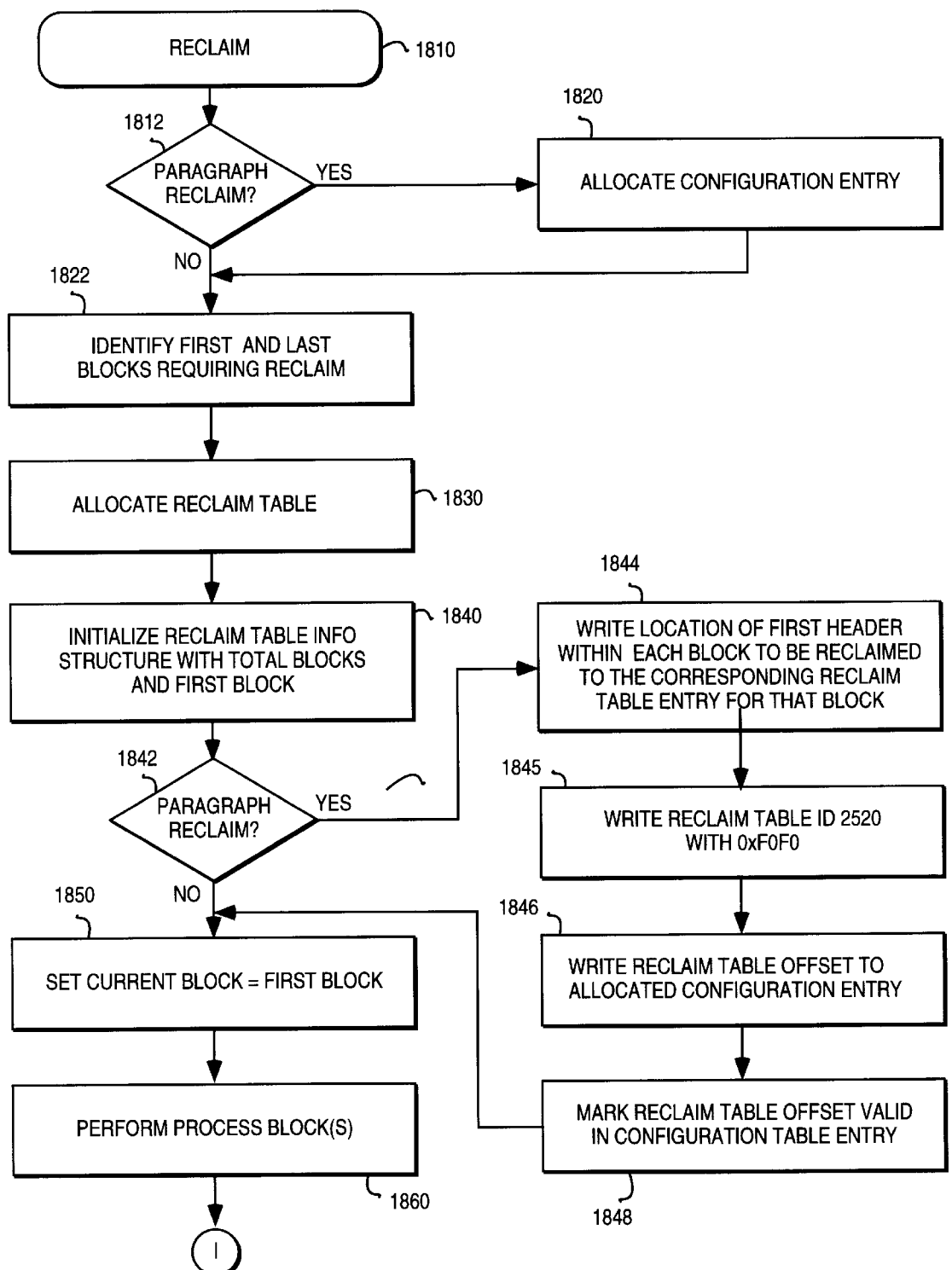
FIG. 18 illustrates a method for reclaiming space used by invalid objects.
Figure 19:
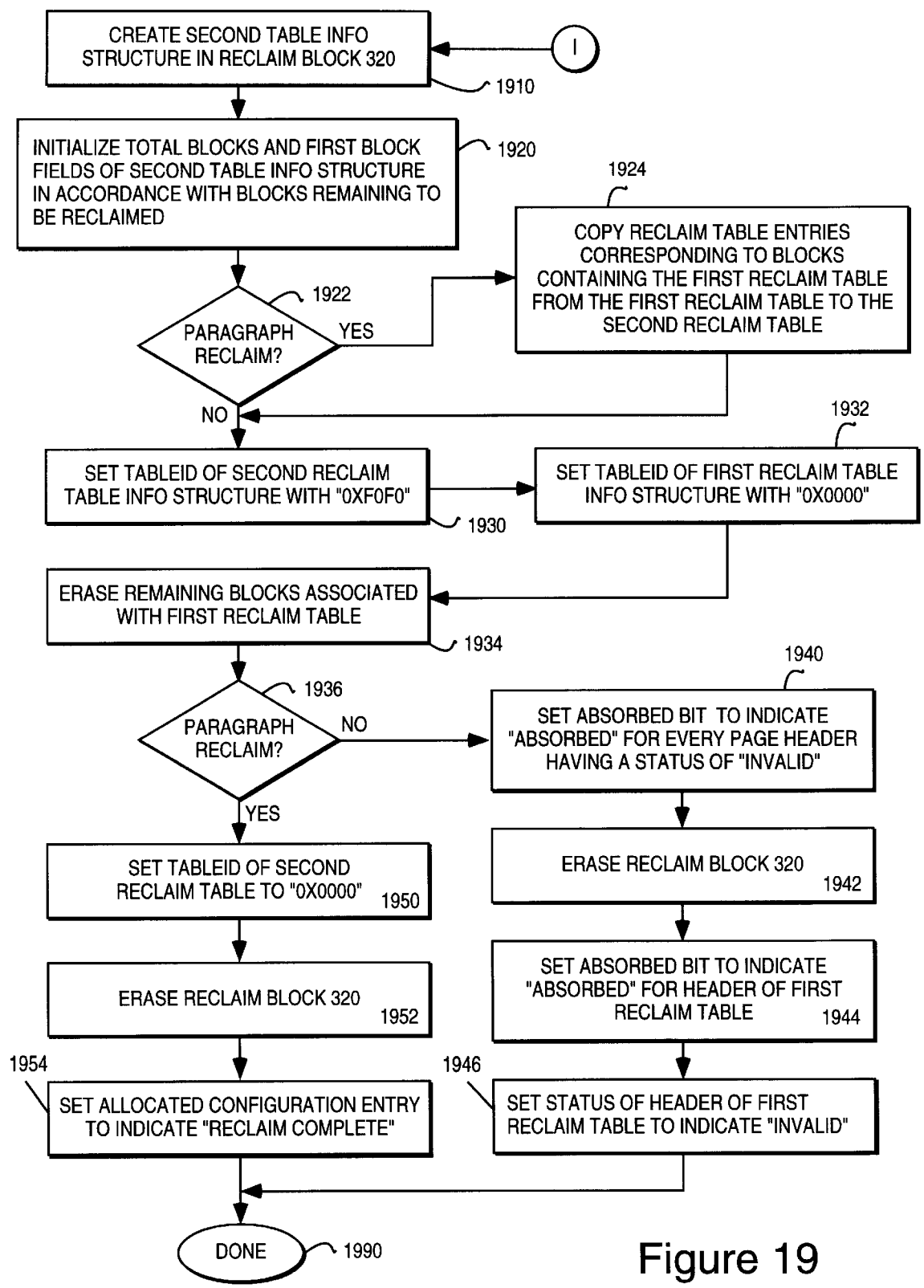
FIG. 19 is a continuation of the method for reclaiming space illustrated in FIG. 18.

FIGS. 18–26 illustrate the reclaim process in detail. FIGS. 18–19 illustrate the main reclaim process. FIGS. 20–24 illustrate each of the sub-processes executed during a reclaim operation.

The reclaim process begins in step 1810. A page reclaim operation and paragraph reclaim operation can be performed in any order, however, performing a page reclaim and then a paragraph reclaim tends to free the maximum amount of space.

A configuration entry is allocated in step 1820 if a paragraph reclaim operation being performed (step 1812). The first and last blocks to be reclaimed are determined in step 1822. The first block can be determined by scanning headers to locate the first invalid object. The beginning of the space allocated to the first invalid object determines the first block that must be reclaimed. The beginning is block aligned towards the top of the class of object space being reclaimed.

A reclaim table is allocated in step 1830. The First Block 1630 and Total Blocks 1640 fields of reclaim table info structure 1610 are initialized in step 1840. Total Blocks includes the blocks allocated to the reclaim table. The Reclaim Table ID 1620 is not initialized during this step and remains "0xFFFF".

The FMM determines the location of objects based upon relative proximity. This requires maintaining the contiguous nature of objects within their respective object spaces. During a paragraph reclaim, however, "gaps" can develop while compacting objects towards the top of paragraph space. The location of the reclaim table must be stored in order to permit finding the reclaim table in the event of an interruption of the paragraph reclamation process.

Step 1842 determines if a paragraph reclaim operation is in progress. If so, step 1844 writes the location of the first header within each block to be reclaimed to the corresponding reclaim table entry 1650 for that block. Some blocks being reclaimed may not have a header. Whenever a header is located, however, step 1844 sets the Valid First Header Location (FHL) 1672 bit of the corresponding reclaim table entry. If the object preceding this header is to be preserved, Previous Valid Object 1674 is also set in step 1844.

Step 1845 sets the Reclaim Table ID 1620 to "0xF0F0". This indicates that the reclaim table initialization is complete.

The reclaim table offset (i.e., Table Offset 1550) is written in the corresponding allocated configuration table entry in step 1846. The reclaim table offset indicates the location of the reclaim table so that it can be found at any point during the paragraph reclaim operation. Reclaim Table Offset Valid 1546 is set in step 1848 to indicate that the reclaim table offset has been written.

Step 1850 identifies the first block to be reclaimed as the current block for subsequent processing in step 1860. In step 1860, the blocks being reclaimed are processed as further detailed in FIGS. 20–26. Step 1860 effectively compacts all non-de-allocated objects (except for the reclaim table) towards the top of object space in accordance with the type of reclaim operation being performed.

Step 1860 processes consecutive blocks beginning with the first block and finishing with the blocks containing the reclaim table. As de-allocated space is made available, valid objects subsequent to the de-allocated space are moved towards the top of the class of object space being reclaimed in order to maintain contiguity. Thus valid page objects are compacted toward the top of page space and valid paragraph objects are compacted toward the top of paragraph space.

The reclaim process of FIG. 18 continues in FIG. 19. After all objects other than the reclaim table have been compacted towards the top of either paragraph or page space, the blocks containing the reclaim table must be reclaimed. A copy of the original reclaim table is needed before processing can continue. Steps 1910 through 1924 of FIG. 17 create a second reclaim table in the reclaim block 320.

In step 1910, a second table info structure is created in reclaim block 320. In step 1920, the Total Blocks 1640 and First Block 1630 fields of the second table info structure are initialized in accordance with the blocks remaining to be reclaimed.

Reclaim table entries corresponding to the blocks containing the first reclaim table are copied from the first reclaim table to the second reclaim table in step 1924 if a paragraph reclaim operation is being performed (step 1922).

The Table ID of the second reclaim table info structure is set to "0xF0F0" in step 1930 to indicate that initialization of the second reclaim table is complete. Step 1932 sets the Table ID of the first reclaim table info structure to "0x0000" to indicate that the first reclaim table is no longer valid and the second reclaim table should be used. The blocks containing the first reclaim table are then erased in step 1934.

Step 1936 determines if the reclaim operation is a paragraph reclaim. If so, processing continues with step 1950. The Table ID of the second reclaim table is set to "0X0000" in step 1950. Reclaim block 320 is erased in step 1952. The Reclaim Complete field 1548 of the allocated configuration entry is set to indicate "reclaim complete" in step 1954. The paragraph reclaim process is finished in step 1990.

Processing proceeds from step 1936 to step 1940 if a page reclamation operation is in progress. Given that the headers for page objects are stored in paragraph space, the space used by page headers for de-allocated page objects cannot be recovered during a page reclamation even though the page objects indicated by the de-allocated page headers no longer exist.

Step 1960 marks any page headers indicating an invalid page object as absorbed. This is accomplished by programming the Absorbed 504 bit in the corresponding headers. The Absorbed 504 bit of every page header having an Invalid status is set to indicate that the object no longer exists in step 1940. The Absorbed bit indicates that the space indicated by the header is no longer allocated and should not be used when locating objects. Thus for example the "allocated" space designated by page headers for de-allocated page objects is not used when calculating page object locations if the header also indicates that the page object was absorbed.

Reclaim block 320 is then erased in step 1942. The Absorbed bit 504 of the header for the first reclaim table is set to indicate absorbed in step 1944. In step 1946, the status of the header for the first reclaim table is set to indicate Invalid. Page reclamation is completed in step 1990.

Figure 20:
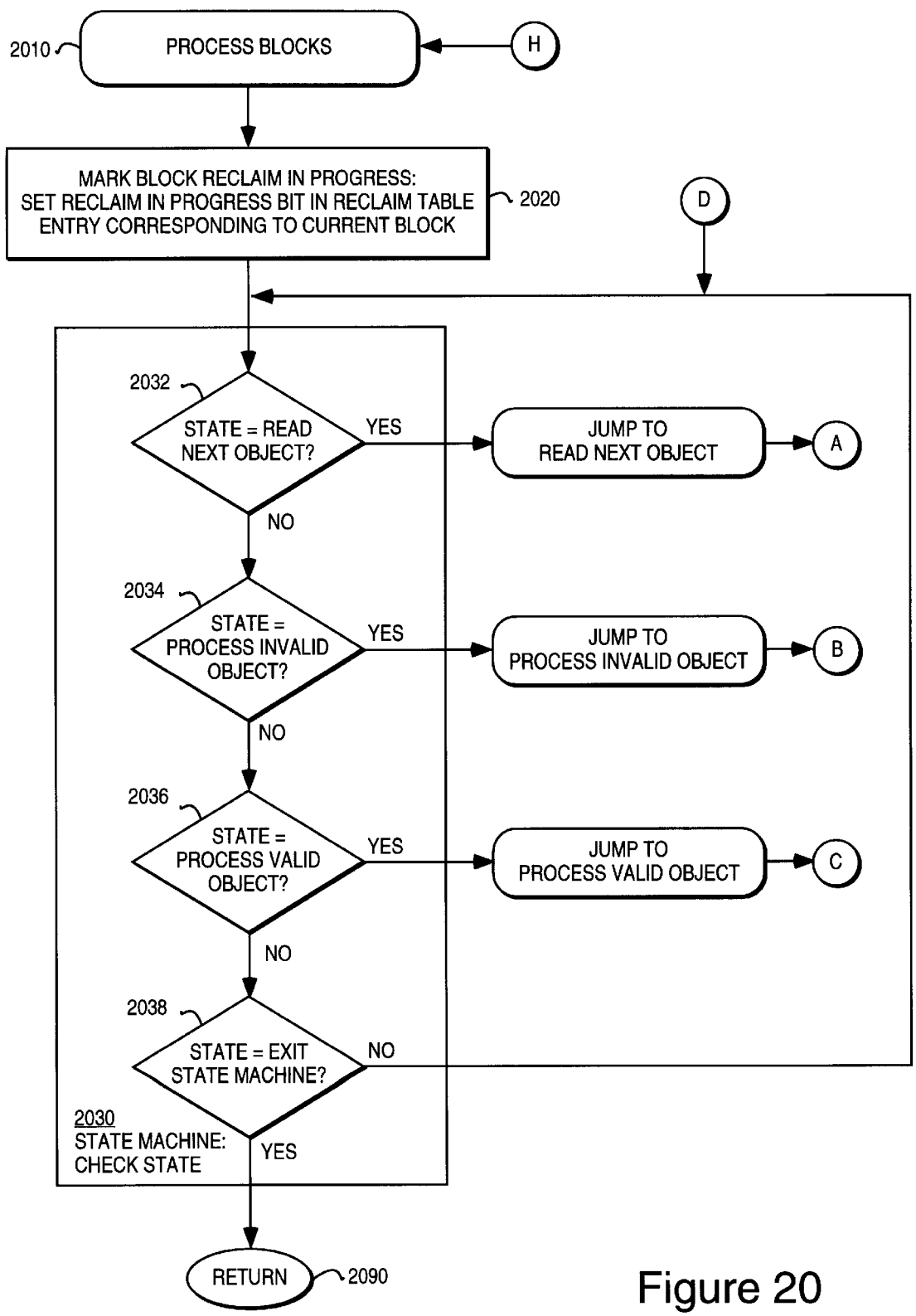
FIG. 20 illustrates the processing of blocks during reclamation.

FIG. 20 illustrates the Process Blocks step 1860 of FIG. 18 in greater detail beginning with step 2010. In step 2020, bit 1662 of the reclaim table entry corresponding to the current block is set to indicate Reclaim In Progress for the current block.

Step 2030 illustrates the Check State state machine. Check State 2030 determines which sub-process to proceed with in accordance with a reclaim process state variable. Steps 2032, 2034, and 2036 cause processing to "jump" to one of the sub-processes Read Next Object, Process Invalid Object, or Process Valid Object in accordance with the value of a state variable. Step 2038 permits exiting the state machine to complete block processing in step 2090.

Figure 21:
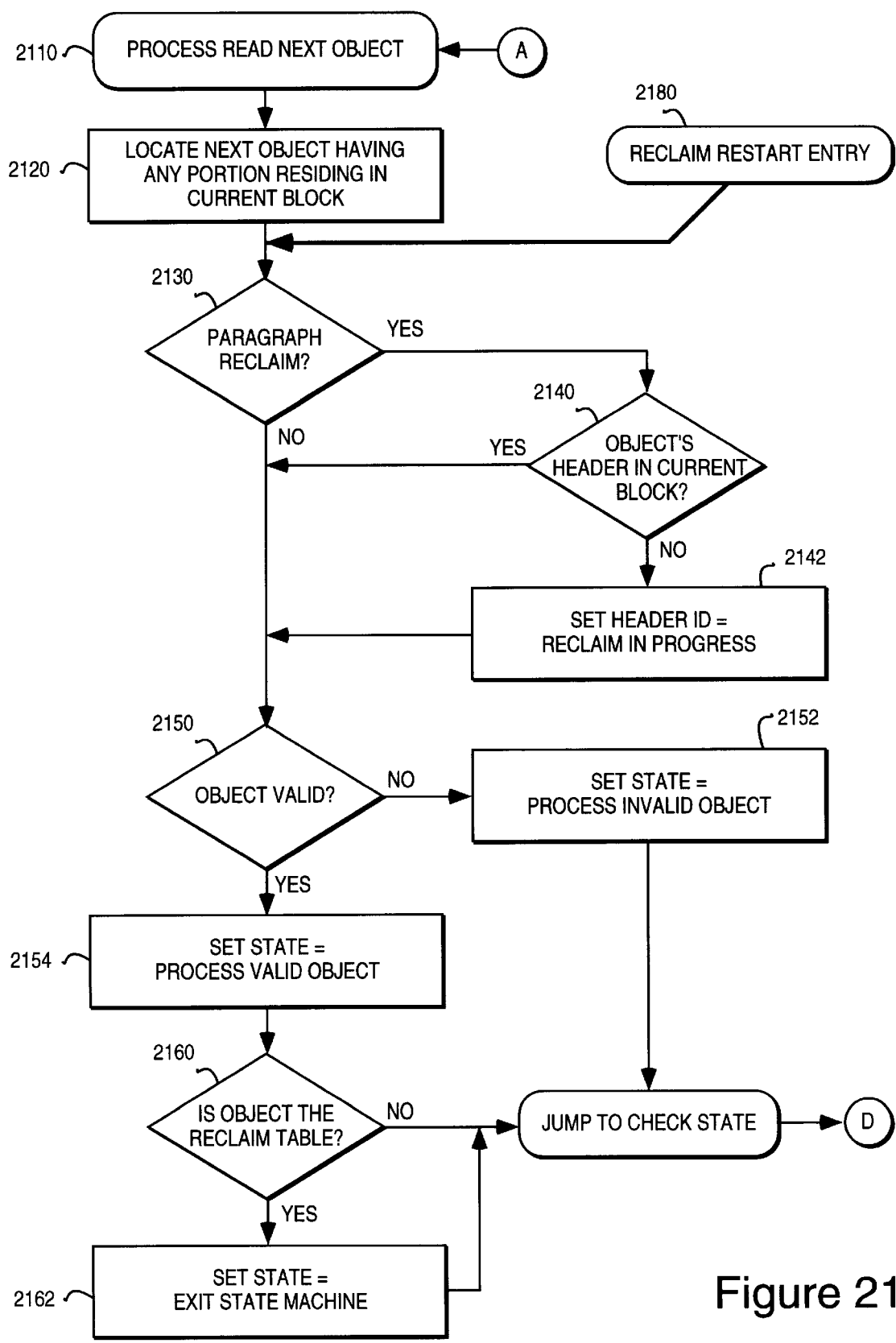
FIG. 21 illustrates the method of reading the next object during reclamation.

FIG. 21 illustrates the Read Next Object sub-process in greater detail beginning with step 2110. Step 2120 locates the next object having any portion residing in the current block.

Step 2130 determines if a page or a paragraph reclaim is in progress. If a paragraph reclaim is in progress, step 2142 sets the Header ID of the object to indicate Reclaim In Progress if the object's header is also in the current block (step 2140).

Step 2150 determines if the object is valid (indicated by Status 506). If the object is not valid, a state variable is set to Process Invalid Object in step 2152. Process control is then transferred to the Check State 2030 state machine.

If the object is valid, the state variable is set to Process Valid Object in step 2154. As long as the object is not the reclaim table, step 2160 transfers process control to the Check State 2030 state machine. When the object is the reclaim table, the state variable is set to Exit State Machine in step 2162. Process control is then transferred back to the Check State 2030 state machine.

Figure 22:
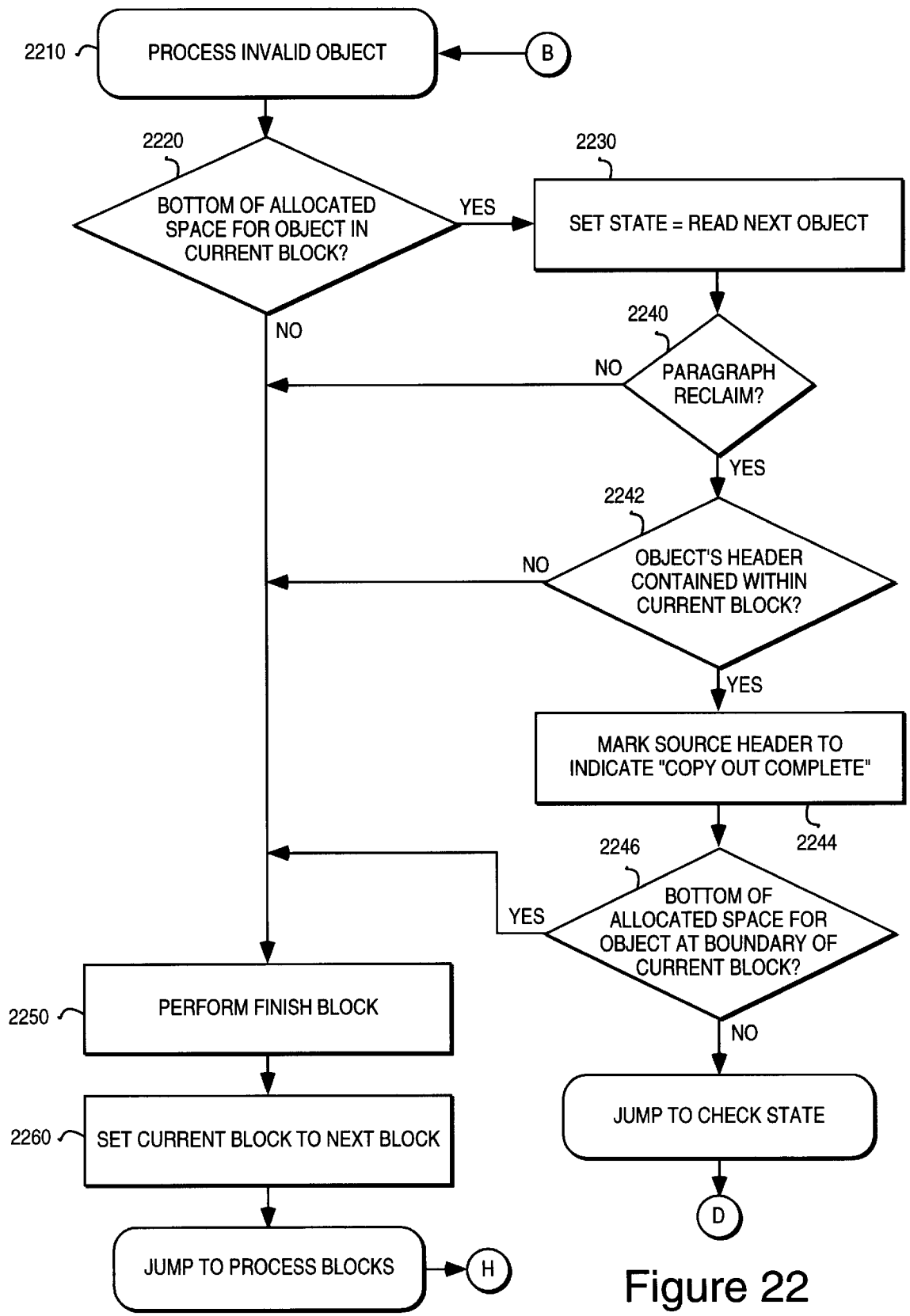
FIG. 22 illustrates a method of processing invalid objects during reclamation.

FIG. 22 illustrates the Process Invalid Object sub-process in greater detail beginning with step 2210. Step 2220 determines if the bottom of the allocated space for the object is in the current block. If not, then there are no more objects in the block and processing proceeds with step 2250 to finish processing the current block. Otherwise, there may be additional valid objects in the current block, so the state variable is set to Read Next Object in step 2230.

Step 2240 determines if a paragraph reclaim is in progress. If a paragraph reclaim is in progress, then the Header ID of the invalid object is set to Copy Out Complete in step 2244 as long as the header is contained within the current block (step 2242). If the bottom of the allocated space for the object is at the boundary of the current block, then step 2246 ensures that the block is treated as finished by proceeding to step 2250. Otherwise, step 2246 returns control to the CheckState state machine 2030.

Figure 26:
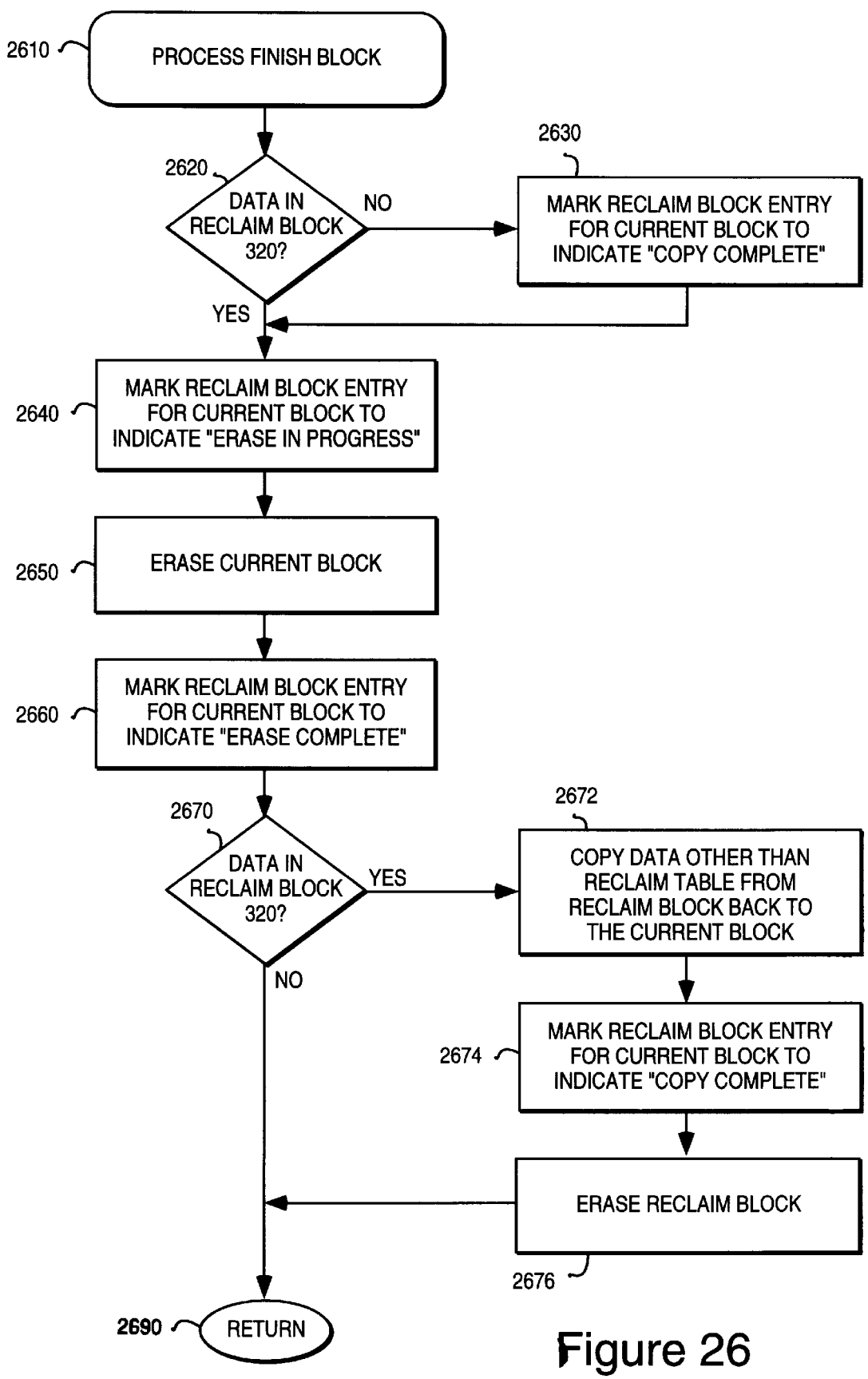
FIG. 26 illustrates a method for completing the reclamation of the current block.

In any event, processing continues with step 2250 to finish processing the current block. The Finish Block process is illustrated in FIG. 26. After completion of the Finish Block process in step 2250, the next block to be reclaimed is identified as the current block in step 2260.

In one embodiment the next block to be reclaimed is determined by incrementing or decrementing a value corresponding to the current block. Within a given object space, reclamation proceeds from the top of that class of object space and proceeds to the bottom of that class of object space.

Advancing to the next block can be accomplished by decrementing during a paragraph reclaim and by incrementing during a page reclaim, for example. The implementation of step 2260 is dependent upon the block identification scheme and the orientation of the classes of object space within the managed object space. After step 2260, control is transferred to the Process Blocks routine illustrated in FIG. 20.

Figure 23:
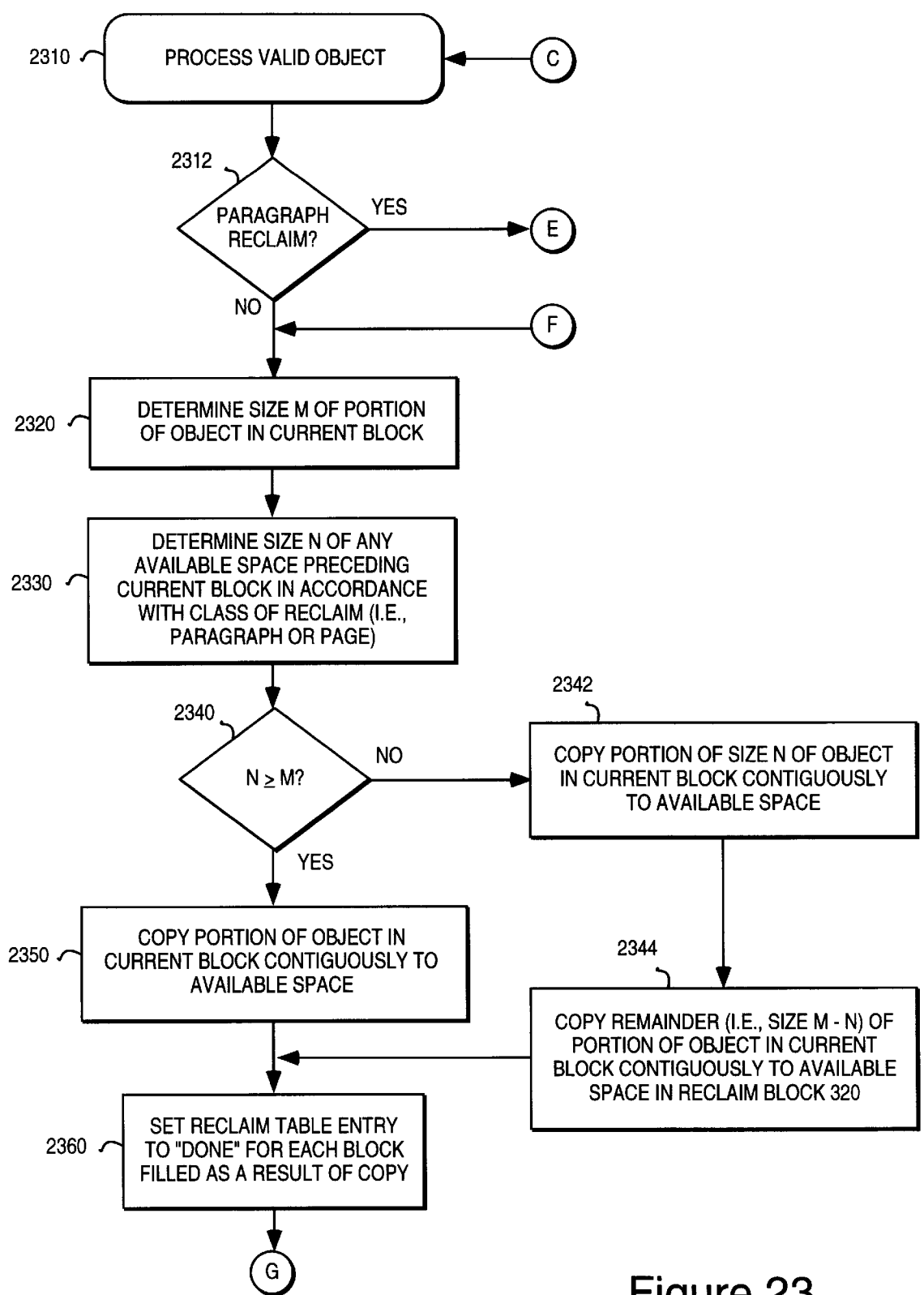
FIG. 23 illustrates a method of processing valid objects during reclamation.
Figure 24:
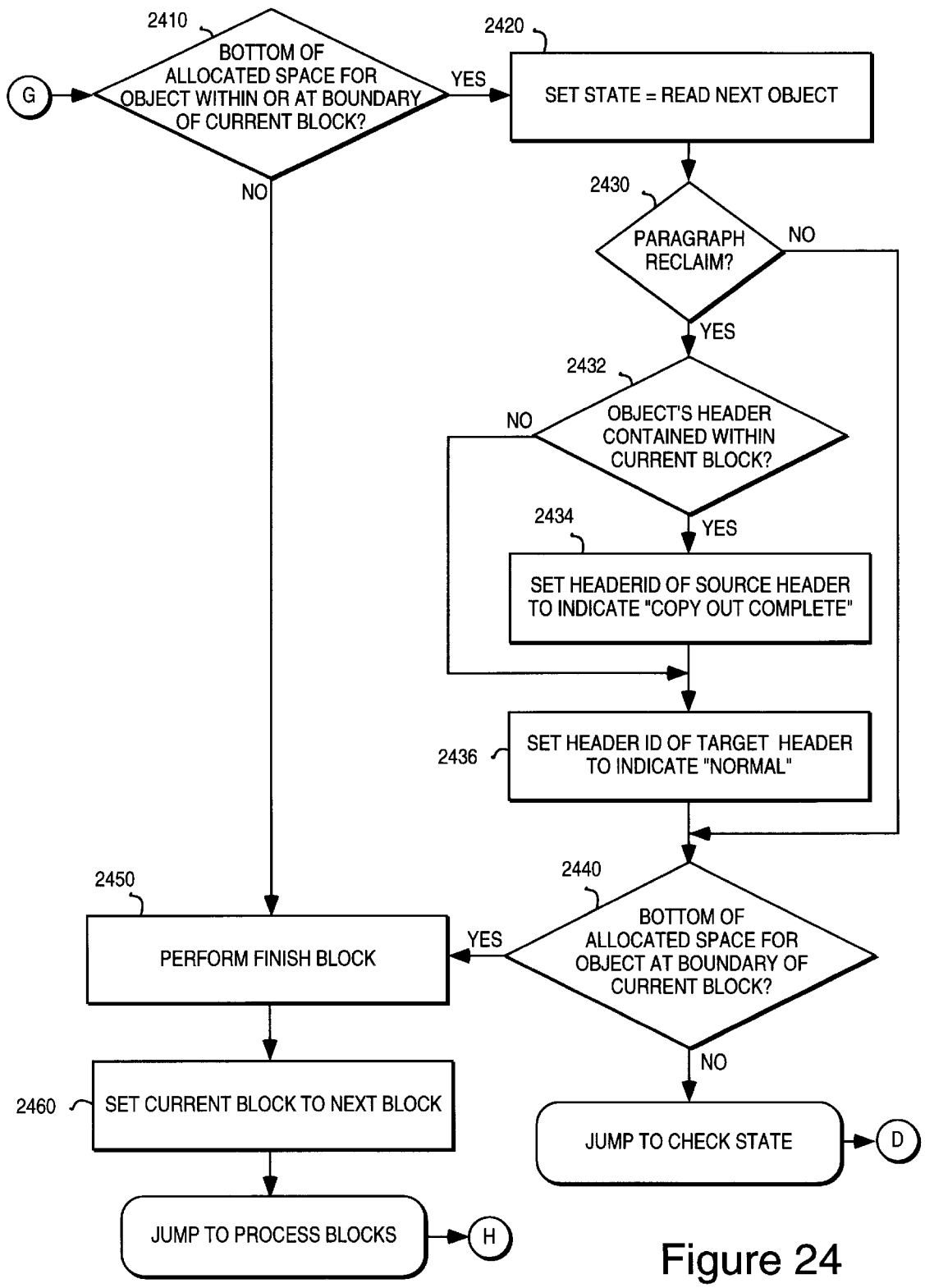
FIG. 24 is a continuation of the method of processing valid objects illustrated in FIG. 23.
Figure 25:
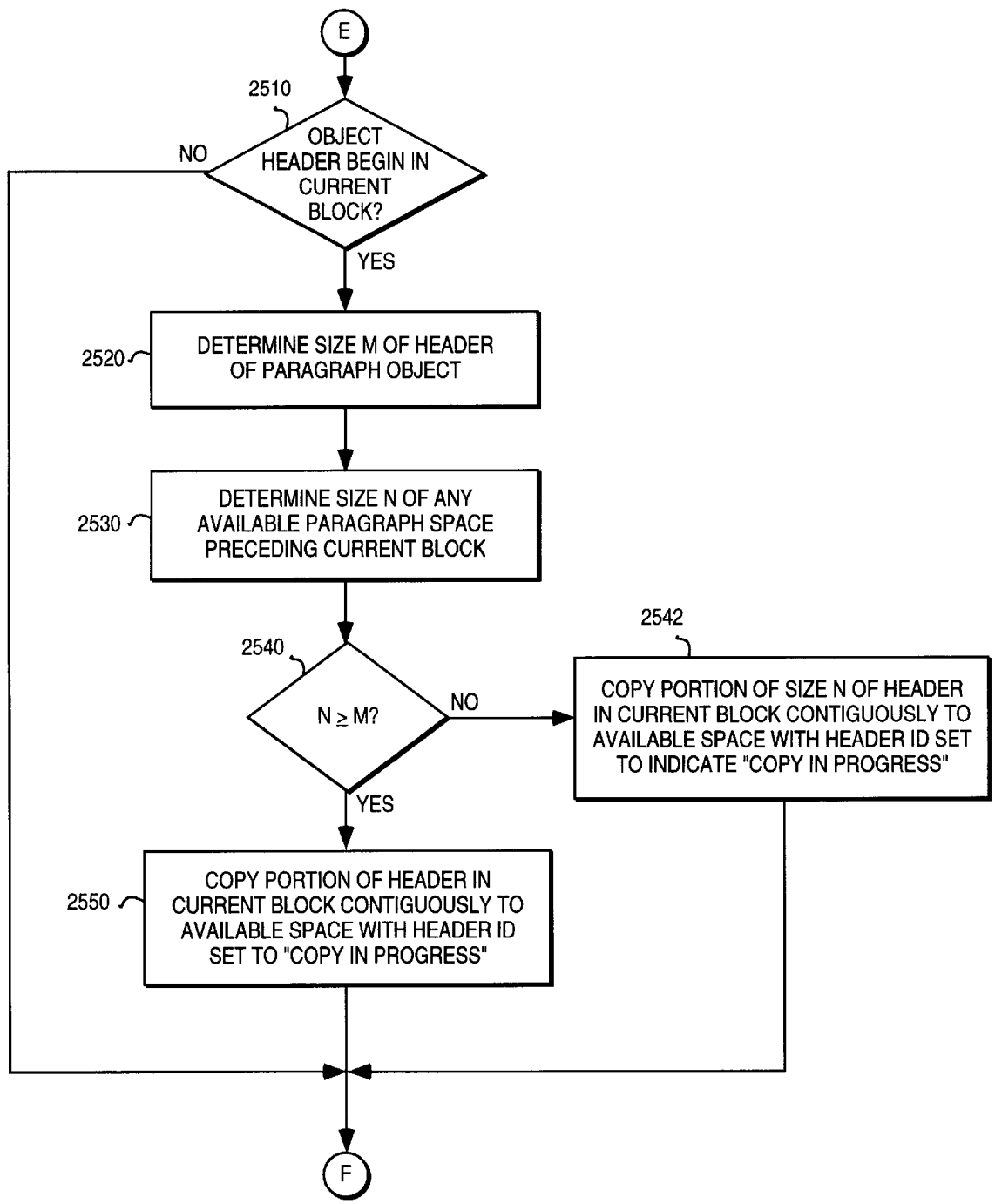
FIG. 25 is a continuation of the method of processing valid objects illustrated in FIG. 23.

FIGS. 23–25 illustrate the Process Valid Object sub-process beginning with step 2310. Step 2312 determines if a paragraph reclaim is in progress. If so, then additional processing illustrated in FIG. 25 and discussed below is carried out.

The size M of the portion of the object in the current block is determined in step 2320. Step 2330 determines the size N of any available space preceding the current block in accordance with the class of reclaim. For the arrangement illustrated in FIG. 22, "preceding" refers to blocks having block numbers lower than the current block during a page reclaim. Conversely, "preceding" refers to blocks having block numbers higher than the current block during a paragraph reclaim.

Step 2340 determines if the amount of available space N is greater than or equal to M, wherein M represents the amount of space required to store the entire portion of the object from the current block.

If $N \geq M$, then the portion of the object in the current block is contiguously copied to the available space in step 2350. If N<M, then as much of the portion of the valid object within the current block as possible is copied to the available space. Thus step 2342 copies a portion of size N of the header from the current block to the available space. The remainder (i.e., of size M–N) of the portion of the object in the current block is copied contiguously to available space in the reclaim block in step 2344.

The original object and header are referred to as the original, source, or "copied from" object and header. The objects and headers created by the copying process are referred to as the "copied to," or "target" headers and objects. After either step 2350 or step 2344, the block full/done bit (1670) of the reclaim block entry for the current block is set in step 2360 after copying all of the valid objects or portions of valid objects in the current block to the available space and the reclaim block.

Valid object processing continues in FIG. 24. Step 2410 determines if the bottom of allocated space for the original object is within the current block. If not, then there are no more objects or portions of objects to process within the current block. Thus processing continues with step 2450 to finish the current block. If the bottom of allocated space is within the current block, then the CheckState state variable is set to Read Next Object in step 2420.

Step 2430 determines if a paragraph reclaim is in progress. If so, then the Header ID of the source header is set to indicate Copy Out Complete in step 2434 as long as the source header and source object are both contained within the current block (step 2432). The Header ID of the target header is set to indicate Normal in step 2436.

Processing continues with step 2440 to determine if the bottom of allocated space for the object is either at the boundary of the current block. Processing of valid objects in the current block is finished if this condition is met and processing can continue with step 2450. Otherwise control is transferred to the Check State 2030 state machine.

Step 2450 finishes processing of the current block. The Finish Block process is illustrated in FIG. 26. After processing of the current block is finished in step 2450, the next block to be reclaimed is identified as the current block in step 2460. Control is then transferred to the Process Blocks sub-process.

FIG. 25 illustrates the additional processing for paragraph objects discussed above with respect to step 2312 of FIG. 23. Step 2510 determines if the object's header begins in the current block. If so, the size M of the portion of the header in the current block is determined in step 2520. Step 2530 determines the size N of any available paragraph space preceding the current block.

Step 2540 determines if the amount of available space N is greater than or equal to M, wherein M represents the amount of space required to store the header. If N≧M, then the header is contiguously copied to the available space in step 2550 with the Header ID set to indicate Copy In Progress.

If N<M, then as much of the header as possible is copied to the available space. Thus step 2542 copies a portion of size N of the header from the current block to the available space with the Header ID of the target header set to Copy In Progress.

The remaining reclaim sub-process, Finish Block is illustrated in FIG. 26 beginning with step 2610. Step 2630 marks the reclaim table entry corresponding to the current block to indicate Copy Complete, (bit 1668) if there is no data in the reclaim block (step 2620).

Step 2640 marks the reclaim table entry corresponding to the current block to indicate Erase In Progress (bit 1664). The current block is erased in step 2650. Step 2660 marks the reclaim table entry corresponding to the current block to indicate Erase Complete (bit 1666).

Step 2670 determines if there is any data in reclaim block 320. If there is no data in the reclaim block, then processing of the current block is completed in step 2690.

If there is data in the reclaim block, step 2672 copies any non-reclaim table data to the current block. The reclaim table entry for the current block is marked to indicate Copy Complete (bit 1668) in step 2674. The reclaim block is then erased in step 2676. Processing of the current block is then completed in step 2690.

H. Power Loss Recovery

The FMM provides the ability to recover in the event of a power failure or other system failure that occurs during a reclamation, allocation, or re-allocation operation. In particular, the FMM provides the ability to automatically restore a valid copy of an old version of an object in the event of a power failure during a re-allocation operation.

FIG. 27 illustrates the FMM initialization process beginning with step 2710. Step 2712 reads any configuration table in managed object space. Step 2714 reads any configuration table in the reclaim block. These configuration tables can be located and authenticated by the Configuration IDs (1720) in their respective headers.

Step 2720 determines the recovery state from the configuration tables. If no authentic configuration table can be found in either the managed object space or the reclaim block, then a fatal error has occurred. If an authentic configuration table can be found, then the entries can be scanned to determine if a paragraph reclaim operation or a re-allocation operation was in progress.

Step 2730 determines whether the recovery state indicates a fatal error. In one embodiment, the FMM provides the user with the option to perform user routines and to control whether the flash should be reformatted. If so, step 2732 permits executing optional user routines for unformatted flash. If the user chooses to reformat the flash memory, the flash memory is erased in step 2734. A new configuration table header is created in step 2736 and initialization is completed in step 2790.

Step 2740 determines whether the recovery state indicates that a paragraph reclaim was interrupted. If so, the paragraph reclaim is restarted in step 2742. Referring to FIG. 21, the paragraph reclaim process is restarted at step 2130 as indicated by reclaim restart entry 2180.

If a paragraph reclaim was not in progress, step 2750 determines whether a re-allocation was in progress. If so, then step 2752 performs re-allocate under restart conditions.

If there was not a fatal error (step 2730), a paragraph reclaim in progress (step 2740) or a re-allocate in progress (step 2750), then processing continues by performing allocation recovery in step 2760. Allocation recovery is also performed after either re-allocation (step 2752) or paragraph reclamation (step 2742) has completed.

After performing an allocation recovery, step 2762 determines if a page reclaim was in progress. If so, then page reclamation is restarted in step 2764. After completing any page reclamation that may have been in process, step 2766 determines if either page or paragraph object system reserves are used. If so, step 2768 performs a paragraph reclamation.

After completing any paragraph reclamation, valid duplicate objects created during the re-allocation process and objects with a status of Write In Progress are handled in step 2770. Initialization is completed in step 2790.

Figure 28:
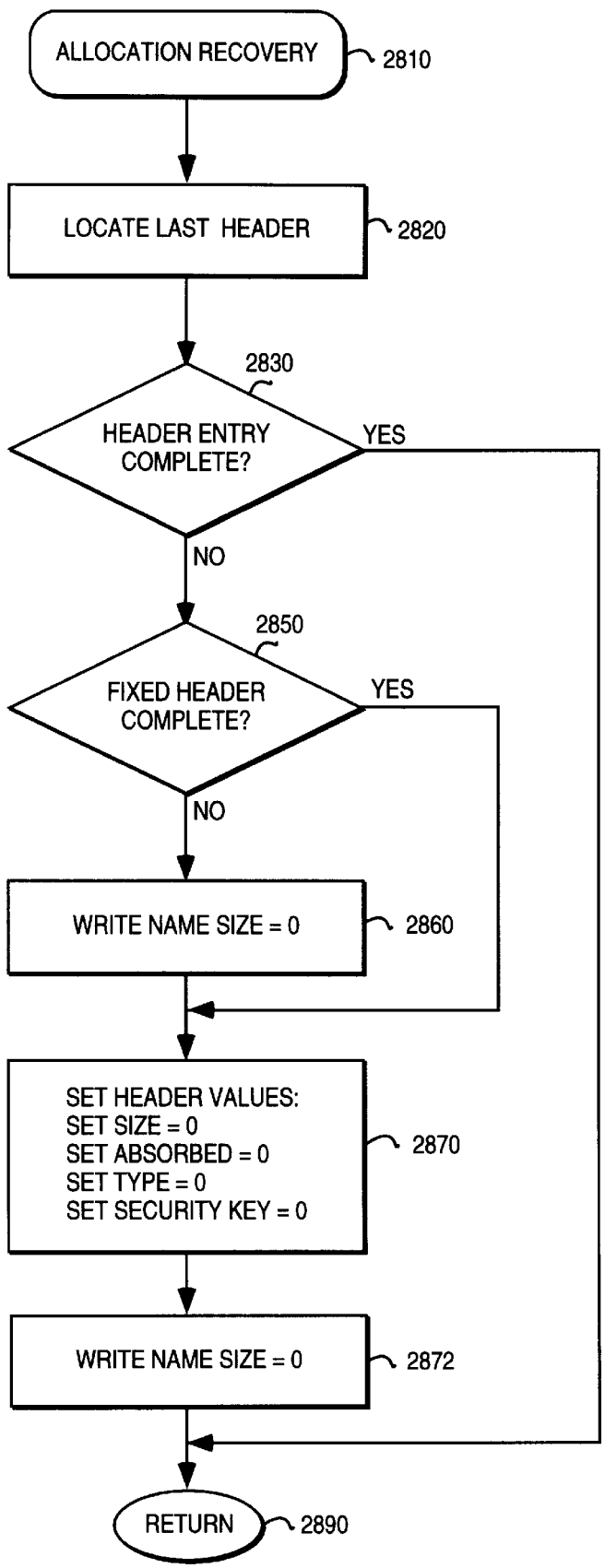
FIG. 28 illustrates a method of recovering from an allocation error.

Step 2760 is further illustrated in FIG. 28 beginning with step 2810. A power failure may have occurred during an allocation. If so, then only the last header might be corrupted or incomplete. Step 2820 locates the last header. Step 2830 determines whether the last header entry is complete. The header is considered to be complete when 1) the Header ID is "0xFXF0", 2) Fixed Header Complete 508 is marked to indicate that the fixed portion of the header has been written, and 3) Status 506 is not Available. If the header entry is determined to be complete in step 2830, allocation recovery is finished in step 2890.

If the header is not complete, step 2850 determines if the fixed portion of the header is complete using Fixed Header Complete 508. If the fixed portion of the header is complete, then selected header values other than Name Size are programmed with "0"s in step 2870. In one embodiment, these selected header values include Size, Absorbed, Type, and Security Key. If the fixed portion of the header is not complete, then the Name Size is programmed with "0"s in step 2860 before performing step 2870.

Step 2872 sets Fixed Header Complete 508 to ensure that Fixed Header Complete indicates that the fixed portion of the header is completed. Allocation recovery is then finished in step 2890.

Referring to FIG. 27, handling of objects with a status of Write In Progress and duplicate valid objects is performed in step 2770. Step 2770 is further detailed in FIG. 29 beginning with step 2910.

Step 2920 scans headers to locate objects with a status of Write In Progress. Step 2922 determines if any such objects were found. If so, then the object header status is marked Invalid in step 2930. Steps 2920 through 2930 are repeated until step 2922 determines there are no more objects with a status of Write In Progress.

After handling Write In Progress objects, re-allocation recovery proceeds to handle duplicate valid objects beginning with step 2940.

Step 2940 scans the headers to locate duplicate valid objects. Step 2942 determines if any such objects were found. Duplicate valid objects have the same Name and Type and a status of Valid. If so, then the object header status of the first of the two objects is invalidated by marking the first object header status Invalid in step 2950.

The first object is the object closer to the top of its associated object space. The first object represents the "earlier" version of the object because during normal FMM operation, the process of writing the second object (i.e., the object closer to the bottom of its associated object space) is necessarily performed subsequently to process of writing of the first object.

Steps 2940 through 2950 are repeated until step 2942 determines that no more duplicate valid objects exist. Re-allocation recovery is then completed in step 2990.

IV. Conclusion

Allocation, writing, reading, de-allocation, re-allocation, and reclamation processes are provided for a method of managing a symmetrically blocked nonvolatile memory having a bifurcated storage architecture.

In the preceding detailed description, the invention is described with reference to specific exemplary embodiments thereof. Various modifications and changes may be made thereto without departing from the broader spirit and scope of the invention as set forth in the claims. The specification and drawings are, accordingly, to be regarded in an illustrative rather than a restrictive sense.

APPENDIX

The following terms and definitions refer to the header data structure illustrated in FIG. 5:

Header ID 502—a paragraph-aligned field used to distinguish headers from other objects stored within the paragraph object space.

Attributes 540—a byte aligned field. Attributes is a two byte field comprised of a number of other fields including Absorbed 504, Status 506, Fixed Header Complete 508, Backup Complete 510, Privilege 512, Alignment 514, Reserves 516, Confidence 518, and Size16_19 520.

Absorbed 504—is a one bit field that indicates that an object has been reclaimed and thus no longer resides in memory.

Status 506—indicates whether the object is valid, invalid, being written, or bad.

Fixed Header Complete 508—is used during the allocation process to ensure creation of the fixed portion of the header (i.e., the non-Name fields) have been written.

Backup Complete 510—is used to ensure that an object having a status of Write In Progress is a valid duplicate (static re-allocation) so that failures during the creation of the Write In Progress object do not result in a corrupted copy of an original being restored during the initialization process.

Privilege 512—indicates privilege levels used by a typical memory management unit (MMU). Privilege 512 is used to validate the accessibility of the object. For example, this field may be used to define whether an object is modifiable by a user process or only by an operating system process.

Alignment 514—defines the allocation granularity and alignment of the object identified by the header. This field effectively identifies the class of the object. Thus Alignment indicates whether the object is a paragraph or a page object and thus whether the object is aligned on paragraph boundaries or page boundaries.

Reserves 516—is used in conjunction with Confidence 518. Reserves 516 indicates that space should be reserved during initial allocation to ensure the ability to perform a re-allocation.

Confidence 518—indicates whether a duplicate of the original object should created during a static re-allocation and whether the original object should be preserved until writing of the updated object is complete during a dynamic re-allocation. Confidence 518 is used in conjunction with Reserves 516 to define an object's Recovery Level.

Size0_15 530, Size 16_19 520—The size of the object identified by the header is indicated by fields 530 (Size0_15) and 520 (Size16_19). When concatenated, fields 530 and 520 form a 20 bit field describing the size of the stored object in allocation units (i.e., either paragraphs or pages). A value of n represents n*4 K allocated memory for a page object or n*16 bytes for a paragraph object. Thus in the embodiment illustrated, the maximum size permitted is four gigabytes for a page object or sixty-four megabytes for a paragraph objects. Size0_15 and Size 16_19 are collectively referred to as the Size field.

Name Size 532—indicates the size of the name stored within Name 550. In the embodiment illustrated, Name Size is 1 byte thus allowing for a 255 byte value stored in Name 550 (a 0 byte length Name is permitted, thus the maximum length is limited 255 bytes) In an alternative embodiment, a terminator such as NULL is used to indicate the end of the stored name thus eliminating the need for the Name Size 532 field.

Type 534 is used to define a type or category for the stored object. For example, the type for BIOS might be "BIOS." Generally, type may have any value, however, some values are specifically reserved for use by FMM. In one embodiment, Type 534 is a four byte field.

Security Key 536 is reserved for use as a software based security key that can be used to validate the accessibility of the object. FMM does not use this key. Security Key 502 is provided for program developers to use as may be desired. In one embodiment, Security Key 502 is a four byte field.

Name 550 is used to store the name of the object. Name 550 is a paragraph-aligned field. In the embodiment illustrated, the length of the name may be 255 bytes. Name 550 and Type 534 are used to uniquely identify objects within the managed object space.

What is claimed is:

1. A method of performing reliable updates in a block erasable nonvolatile memory comprising:

receiving an allocation request to reallocate a first object in said memory with a second object, wherein said first object and said second object have a same name and a same type, and said memory comprising a managed object space arranged into two classes of space to accommodate distinct objects, wherein objects of a first class are stored contiguously proceeding from a first end of said managed object space towards a second end of said managed object space to form a first class of space, and objects of a second class are stored contiguously proceeding from said second end towards said first end to form a second class of space;

validating said allocation request;

allocating a space for said second object if said allocation request is valid;

writing said second object into said space;

tracking a write status of said second object; and invalidating said first object.

2. The method of claim 1 further comprising determining memory availability during space allocation.

3. The method of claim 1 wherein invalidating said first object occurs when said write status indicates writing of said second object is complete.

4. The method of claim 1 further comprising invalidating said second object if upon initialization, said write status indicates that writing of said second object is incomplete.

5. The method of claim 1 wherein validating said allocation request comprises scanning said memory to locate said first object having a valid status.

6. The method of claim 1 wherein allocating a space for said second object further comprises determining whether sufficient space exists in said memory to accommodate allocating said space for said second object.

7. The method of claim 6 further comprising initiating a reclaim process if insufficient free space exists to allocate said space for said second object.

8. The method of claim 1 wherein said nonvolatile memory comprises symmetrically blocked flash electrically erasable programmable read only memory.

9. The method of claim 1 wherein objects of said first class are page objects and objects of said second class are paragraph objects.

10. A method of reliably rewriting a first object in a block erasable nonvolatile memory comprising:

receiving an allocation request to reallocate a first object in said memory with a second object, said memory comprising a managed object space arranged into two classes of space to accommodate distinct objects, wherein objects of a first class are stored contiguously proceeding from a first end of said managed object space towards a second end of said managed object space to form a first class of space, and objects of a second class are stored contiguously proceeding from said second end towards said first end to form a second class of space;

validating said allocation request;

copying said first object from its associated space to a temporary location;

reclaiming said space associated with said first object;

writing said second object into said space associated with said first object;

tracking a write status of said second object; and invalidating said first object.

11. The method of claim 10 wherein invalidating said first object occurs when said write status indicates writing of said second object is complete.

12. The method of claim 10 further comprising invalidating said second object if upon initialization, said write status indicates that writing of said second object is incomplete.

13. The method of claim 10 wherein validating said allocation request comprises scanning said memory to locate said first object having a valid status.

14. The method of claim 10 wherein validating said allocation request comprises determining whether said first object and said second object are of a same type and have a same name.

15. The method of claim 10 further comprising determining whether sufficient space exists in said memory to accommodate said second object.

16. The method of claim 15 further comprising generating an error if insufficient space is available.

17. The method of claim 10 wherein said nonvolatile memory comprises symmetrically blocked flash electrically erasable programmable read only memory.

18. The method of claim 10 wherein objects of said first class are page objects and objects of said second class are paragraph objects.

19. A method of reallocating a first object stored within a block erasable nonvolatile memory comprising:

receiving an allocation request to reallocate a first object in said memory with a second object, said memory comprising a managed object space arranged into two classes of space to accommodate distinct objects, wherein objects of a first class are stored contiguously proceeding from a first end of said managed object space towards a second end of said managed object space to form a first class of space, and objects of a second class are stored contiguously proceeding from said second end towards said first end to form a second class of space;

scanning said memory to locate said first object having a valid status and invalidating said first object;

allocating a space for said second object;

writing said second object into said space; and tracking a write status of said second object.

20. The method of claim 19 further comprising determining memory availability during space allocation.

21. The method of claim 19 further comprising invalidating said second object if upon initialization, said write status indicates that writing of said second object is incomplete.

22. The method of claim 19 further comprising initiating a reclaim process if insufficient free space exists to allocate said space for said second object.

23. The method of claim 19 wherein said nonvolatile memory comprise symmetrically blocked flash electrically erasable programmable read only memory.

24. The method of claim 19 wherein objects of said first class are page objects and objects of said second class are paragraph objects.

* * * * *